(12) United States Patent
Nakashima et al.

(10) Patent No.: US 7,583,734 B2
(45) Date of Patent: Sep. 1, 2009

(54) TWO-WIRE TYPE DATA COMMUNICATION METHOD AND SYSTEM, CONTROLLER AND DATA RECORDING APPARATUS

(75) Inventors: Shota Nakashima, Osaka (JP); Atsuo Inoue, Kyoto (JP); Seizo Inagaki, Osaka (JP)

(73) Assignee: Panasonic Corporation, Osaka (JP)

( * ) Notice: Subject to any disclaimer, the term of this patent is extended or adjusted under 35 U.S.C. 154(b) by 665 days.

(21) Appl. No.: 10/858,388

(22) Filed: Jun. 2, 2004

(65) Prior Publication Data

US 2005/0008080 A1 Jan. 13, 2005

(30) Foreign Application Priority Data

Jun. 2, 2003 (JP) ............... P. 2003-156584

(51) Int. Cl.
*H04L 5/16* (2006.01)
(52) U.S. Cl. .............. 375/257; 375/220; 375/316; 375/327; 375/355; 375/356; 375/357; 375/377; 375/259; 327/1; 327/100; 370/69.1; 455/59
(58) Field of Classification Search .......... 375/220, 375/257, 316, 327, 354, 355, 356, 357, 377, 375/259; 327/1, 100; 370/69.1; 455/59
See application file for complete search history.

(56) References Cited

U.S. PATENT DOCUMENTS 4,847,867 A * 7/1989 Nasu et al. .............. 375/257

5,473,635 A * 12/1995 Chevroulet .............. 375/287
5,898,735 A   4/1999 Yamauchi
6,111,918 A   8/2000 Gotaas
6,304,613 B1 * 10/2001 Koller et al. ............ 375/268
6,351,489 B1 *  2/2002 Tetzlaff ................... 375/238

(Continued)

FOREIGN PATENT DOCUMENTS

EP   1 241 844 A2   9/2002

(Continued)

OTHER PUBLICATIONS

Japanese Office Action, with English Translation, issued in Japanese Patent Application No. 2003-156584, dated on Jan. 9, 2008.

(Continued)

*Primary Examiner*—Shuwang Liu
*Assistant Examiner*—Helene Tayong
(74) *Attorney, Agent, or Firm*—McDermott Will & Emery LLP

(57) ABSTRACT

When a controller transmits a clock pulse of a positive phase as a first transmit signal (a) and a clock pulse of an opposite phase as a second transmit signal (b), the controller modulates the "H" pulse of the second transmit signal to a signal advanced by time of td1 relative to the "L" pulse of the first transmit signal when the logic of transmit data is "1", and to a signal advanced by time of td2 relative thereto when the logic of transit data is "0" and transmits the modulated signal. A data carrier device detects the change of the delay time of the second transmit signal by using a clock extracted from the first transmit signal to demodulate data (e).

15 Claims, 15 Drawing Sheets

U.S. PATENT DOCUMENTS

| | | | |
|---|---|---|---|
| 6,384,723 B1 * | 5/2002 | Keeler et al. | 340/513 |
| 6,474,558 B1 * | 11/2002 | Reiner | 235/492 |
| 6,493,401 B1 | 12/2002 | Erckert | |
| 2003/0039313 A1 | 2/2003 | Inoue et al. | |

FOREIGN PATENT DOCUMENTS

| | | |
|---|---|---|
| EP | 1 241 844 A3 | 9/2002 |
| EP | 1 289 214 A2 | 3/2003 |
| EP | 1 289 214 A3 | 3/2003 |
| JP | 56-104561 | 8/1981 |
| JP | 59-005763 | 1/1984 |
| JP | 01-143435 | 6/1989 |
| JP | 2003-69653 | 3/2003 |
| WO | WO 02/100058 A1 | 12/2002 |

OTHER PUBLICATIONS

European Search Report issued in corresponding European Patent Application No. EP 04 01 3011, dated May 21, 2007.

* cited by examiner

TWO-WIRE TYPE DATA COMMUNICATION METHOD AND SYSTEM, CONTROLLER AND DATA RECORDING APPARATUS

BACKGROUND OF THE INENTION

1. Field of the Invention

The present invention relates to a two-wire type data communication method and system between a data storage device and a controller in a contact type data storage system, a controller and a data storage device.

2. Description of the Related Art

A contact type data storage system is used in a parts control of OA devices or a schedule control in a factory or the like. A two-wire type data communication system has been employed in a communication between a data storage device and a controller forming the contact type data storage system to make the system compact (for instance, see JP-A-2003-69653).

FIG. 13 is a voltage wave form diagram for explaining a usual two-wire type data communication method. FIG. 14 is a block diagram showing a structural example of a contact type data storage system using the usual two-wire type data communication method. In FIG. 14, the contact type data storage system comprises a controller 1201 and a data storage device 1202.

The controller 1201 includes a clock generating circuit 1205 for forming a clock pulse and a pulse of an opposite phase thereto, a voltage level generating circuit 1203 for generating the amplitude level of the clock pulse, a first transmitting circuit 1204 for changing the amplitude of the clock pulse in accordance with a transmit signal and a first signal detecting circuit 1206 for detecting an amplitude difference appearing in the clock pulse and the pulse of the opposite phase thereto.

Further, the data storage device 1202 includes a rectifying circuit 1208 for full-wave rectifying voltage from the clock pulse and the pulse of the opposite phase thereto, a data demodulating circuit 1209 for detecting the amplitude difference of the clock pulses to reproduce the transmit signal, a second transmitting circuit 1210 for changing a load impedance between two-wire type communication terminals in accordance with the transmit signal to change a voltage amplitude and a clock detecting circuit 1211 for reproducing the clock pulse.

The voltage level generating circuit 1203 includes a resistance R1 connected to a source voltage +V and a resistance R2 connected in series thereto to output the voltage Vout of a node of the resistance R1 and the resistance R2. The transmitting circuit 1204 is composed of a MOS transistor having a source and a drain respectively connected to the resistance R2 and a reference potential GND of the voltage level generating circuit 1203 and a gate to which the transmit signal is inputted to determine the output level Vout of the voltage level generating circuit 1203.

The clock generating circuit 1205 includes two stages of inverters to output clock pulses of the same phase and the opposite phase relative to a clock signal input. The electric power supply terminals of the inverters are respectively connected to the output Vout of the voltage level generating circuit 1203. The amplitudes of the clock pulses of the same phase and the opposite phase are changed in accordance with the output Vout to superimpose the transmit signal on the clock pulses and transmit the superimposed transmit signal to the data storage device 1202.

In the data storage device 1202 for receiving the clock pulse and the pulse of the opposite phase thereto, the data demodulating circuit 1209 extracts a signal component superimposed on the voltage rectified by the rectifying circuit 1208. The clock detecting circuit 1211 is composed of an inverter to reproduce the clock pulse without depending on the superimposed signal component and use the clock pulse as the clock of the data storage device 1202.

The second transmitting circuit 1210 includes a resistance and a switch connected in series between the two-wire type communication terminals of the data storage device 1202 and changes a load impedance between the terminals in accordance with the transmit signal. Thus, the second transmitting circuit changes the amplitude of the clock pulse received from the controller 1201. The signal detecting circuit 1206 is connected to either of the two-wire type communication terminals in the controller 1201 to detect the change of the amplitude of the clock pulse in these terminals as a receive signal.

FIG. 15 is a circuit diagram showing the data demodulating circuit 1209 and an operation thereof is explained by using the voltage wave form diagram of FIG. 13. Firstly, to a low-pass filter 1301, a voltage wave form on which the signal as shown in FIG. 13(e) as an output of the rectifying circuit of the data storage device is superimposed is inputted to remove noise generated due to skew or the like. Then, in a high-pass filter 1302, the leading and trailing edges of the signal are detected and the dc components of the signal are removed as shown in FIG. 13(f).

In a comparator 1303 with a hysteresis, when the output of the high-pass filter 1302 exceeds a high hystresis level, as shown in FIG. 13(g), an internal source voltage level, that is, a logic "H" is outputted. Further, when the output of the high-pass filter is lower than a low hysteresis level, an internal reference voltage level, that is, a logic "L" is outputted. Finally, in a D flip flop 1304, the output of the comparator 1303 is detected at the trailing edge of the output of the clock detecting circuit and outputted as demodulated data.

As described above, in the usual data communication method, a transmit signal component is superimposed on a transmit clock as the change of an amplitude to perform a data communication. In such a way, the signal is mutually transmitted and received and electric power and clocks are simultaneously supplied to the data storage device from the controller.

However, in the above-described usual method, when there is a timing skew between the clock pulse and the clock pulse of the opposite phase thereto as shown in FIG. 13, noise is generated in the rectified internal source voltage. At this time, when the operation of an internal circuit of an incorporated memory is superimposed on the noise, the drop of a power source noise is increased. Consequently, as shown in FIGS. 13(e) to 13(h), an erroneous data demodulation is undesirably performed in the data demodulating circuit.

When the timing skew between the clock pulse and the clock pulse of the opposite phase thereto becomes larger, this phenomenon more frequently arises. Accordingly, in the controller and the transmitting path of the two-wire type communication, a relatively strict timing adjustment is required.

Further, since a structure is designed to superimpose data on the clock pulse by modulating the amplitude and transmit the superimposed data from the controller, a ternary output voltage level is necessary. Thus, the circuit structure of the controller is complicated and the output voltage level needs to be adjusted as well as unevenness in an equivalent resistance of an internal circuit of the data storage device. Accordingly, a burden in designing a system is relatively increased.

SUMMARY OF THE INVENTION

The present invention solves the above-described usual problems and it is an object of the present invention to provide a two-wire type data communication method and system, a controller and a data storage device in which a stable communication can be realized without an erroneous data demodulation due to the influence of skew between signals and a burden for the controller in its design is decreased in a two-wire type data communication for performing a data communication and supplying clocks and electric power by first and second signal lines between the controller and the data storage device.

In order to achieve the above-described object, a two-wire type data communication method according to the present invention defined in claim 1 concerns a data communication method for performing a data communication and supplying clocks and electric power by a first signal line and a second signal line between a controller and a data storage device. A clock pulse of a positive phase is transmitted by the first signal line and a clock pulse of an opposite phase modulated in accordance with the logic of transmit data is transmitted by the second signal line.

According to the above-described constitution, since the clock pulse of the positive phase is extracted on the basis of the first signal line and a signal extracted from the modulated clock pulse of the opposite phase that is transmitted by the second signal line can be decided by using the clock pulse of the positive phase. Thus, a suitable modulation is carried out to perform a demodulation process by a logic circuit without using an edge detecting type demodulation method so that an erroneous demodulation due to a skew between signals can be avoided. Further, since the demodulation can be more simply performed than a related art, merit is large in view of cost. Further, since the structure of the controller does not need ternary voltage values like the related art, an adjustment that takes unevenness in an equivalent resistance of the data storage device into consideration is not necessary. Thus, a burden in design can be reduced.

In a two-wire type data communication method according to the present invention defined in claim 2, the clock pulse of the opposite phase transmitted by the second signal line is modulated and formed depending on the presence or absence of a pulse in accordance with the logic of the transmit data in the two-wire type data communication method according to claim 1.

According to the above-described constitution, since the modulated signal is a total amplitude signal representing a logical value by the presence or absence of the clock pulse, a demodulation process can be performed by a logic circuit without requiring an edge detecting type demodulation method. Thus, a data demodulation substantially having no erroneous demodulation due to the influence of a skew between signals can be carried out.

In a two-wire type data communication method according to the present invention defined in claim 3, the clock pulse of the opposite phase transmitted by the second signal line is modulated and formed by the change of a delay time relative to the clock pulse of the positive phase in accordance with the logic of the transmit data in the two-wire type data communication method according to claim 1.

According to the above-described constitution, since the modulated signal is a total amplitude signal representing a logical value by the change of the delay time of the clock pulse, a demodulation process can be performed by a logic circuit without requiring an edge detecting type demodulation method. Thus, data can be extracted without receiving the influence of internal power source noise due to a timing skew between two-wire transmit signals.

In a two-wire type data communication method according to the present invention defined in claim 4, the clock pulse of the opposite phase transmitted by the second signal line is modulated and formed by the change of a duty ratio in accordance with the logic of the transmit data in the two-wire type data communication method according to claim 1.

According to the above-described constitution, since the modulated signal is a total amplitude signal representing a logical value by the change of a duty ratio of the clock pulse, a demodulation process can be performed by a logic circuit without requiring an edge detecting type demodulation method. Thus, data can be extracted without receiving the influence of internal power source noise due to a timing skew between two-wire transmit signals.

In a two-wire type data communication method according to the present invention defined in claim 5, the clock pulse of the opposite phase transmitted by the second signal line is modulated and formed at a position of a pulse signal superimposed by an opposite polarity in accordance with the logic of the transmit data in the two-wire type data communication method according to claim 1.

According to the above-described constitution, since the modulated signal is a total amplitude signal representing a logical value at the position of the pulse superimposed on the clock pulse of the opposite phase, a demodulation process can be performed by a logic circuit without requiring an edge detecting type demodulation method. Thus, data can be extracted without receiving the influence of internal power source noise due to a timing skew between two-wire transmit signals.

In a two-wire type data communication method according to the present invention defined in claim 6, the clock pulse of the positive phase transmitted by the first signal line and the clock pulse of the opposite phase transmitted by the second signal line are modulated and formed by the change of a duty ratio in accordance with the logic of the transmit data in the two-wire type data communication method according to claim.

According to the above-described constitution, since the modulated signal is a total amplitude signal representing a logical value by the duty ratio of the clock pulse, a demodulation process can be performed by a logic circuit without requiring an edge detecting type demodulation method. Thus, data can be extracted without receiving the influence of internal power source noise due to a timing skew between two-wire transmit signals.

A two-wire type data communication system according to the present invention defined in claim 7 concerns a data communication system for performing a data communication and supplying clocks and electric power by a first signal line and a second signal line between a controller and a data storage device. The controller includes a unit for forming clock pulses of a positive phase and an opposite phase, a unit for transmitting the clock pulse of the positive phase to the first signal line and a unit for modulating the clock pulse of the opposite phase depending on the presence or absence of a pulse in accordance with the logic of transmit data and transmitting the modulated clock pulse to the second signal line. The data storage device includes a unit for rectifying the voltage of the first and second signal lines and supplying source voltage to the data storage device, a unit for extracting a clock in the device on the basis of the first signal line and a data demodulating unit for detecting the presence or absence of the clock pulse of the opposite phase transmitted by the second signal line using the clock in the device.

According to the above-described constitution, since the modulated signal is a total amplitude signal representing a logical value by the presence or absence of the clock pulse, a demodulation process can be performed by a logic circuit without requiring an edge detecting type demodulation method and a data demodulation substantially having no erroneous demodulation due to the influence of a skew between signals can be achieved. Further, since the demodulating circuit of the data storage device can be more simply formed than that of a related art, merit is large in view of cost. Further, since the structure of the controller does not need ternary voltage values like the related art, an adjustment that takes unevenness in an equivalent resistance of the data storage device into consideration is not necessary. Thus, a burden in design can be reduced.

A two-wire type data communication system according to the present invention defined in claim 8 concerns a data communication system for performing a data communication and supplying clocks and electric power by a first signal line and a second signal line between a controller and a data storage device. The controller includes a unit for forming clock pulses of a positive phase and an opposite phase, a unit for transmitting the clock pulse of the positive phase to the first signal line and a unit for modulating the clock pulse of the opposite phase depending on the change of a delay time relative to the clock pulse of the positive phase in accordance with the logic of transmit data and transmitting the modulated clock pulse to the second signal line. The data storage device includes a unit for rectifying the voltage of the first and second signal lines and supplying source voltage to the data storage device, a unit for extracting a clock in the device on the basis of the first signal line and a data demodulating unit for detecting the change of the delay time of the clock pulse of the opposite phase transmitted by the second signal line using the clock in the device.

According to the above-described constitution, since the modulated signal is a total amplitude signal representing a logical value by the change of the delay time of the clock pulse, a demodulation process can be performed by a logic circuit without requiring an edge detecting type demodulation method. Thus, data can be extracted without receiving the influence of internal power source noise due to a timing skew between two-wire transmit signals. Further, since the demodulating circuit of the data storage device can be more simply formed than that of a related art, merit is large in view of cost. Further, since the structure of the controller does not need ternary voltage values like the related art, an adjustment that takes unevenness in an equivalent resistance of the data storage device into consideration is not necessary. Thus, a burden in design can be reduced.

A two-wire type data communication system according to the present invention defined in claim 9 concerns a data communication system for performing a data communication and supplying clocks and electric power by a first signal line and a second signal line between a controller and a data storage device. The controller includes a unit for forming clock pulses of a positive phase and an opposite phase, a unit for transmitting the clock pulse of the positive phase to the first signal line and a unit for modulating the clock pulse of the opposite phase by the change of a duty ratio in accordance with the logic of transmit data and transmitting the modulated clock pulse to the second signal line. The data storage device includes a unit for rectifying the voltage of the first and second signal lines and supplying source voltage to the data storage device, a unit for extracting a clock in the device on the basis of the first signal line and a data demodulating unit for detecting the change of the duty ratio of the clock pulse transmitted by the second signal line using the clock in the device.

According to the above-described constitution, since the modulated signal is a total amplitude signal representing a logical value by the change of the duty ratio of the clock pulse, a demodulation process can be performed by a logic circuit without requiring an edge detecting type demodulation method. Thus, data can be extracted without receiving the influence of internal power source noise due to a timing skew between two-wire transmit signals. Further, since the demodulating circuit of the data storage device can be more simply formed than that of a related art, merit is large in view of cost. Further, since the structure of the controller does not need ternary voltage values like the related art, an adjustment that takes unevenness in an equivalent resistance of the data storage device into consideration is not necessary. Thus, a burden in design can be reduced.

A two-wire type data communication system according to the present invention defined in claim 10 concerns a data communication system for performing a data communication and supplying clocks and electric power by a first signal line and a second signal line between a controller and a data storage device. The controller includes a unit for forming clock pulses of a positive phase and an opposite phase, a unit for transmitting the clock pulse of the positive phase to the first signal line and a unit for modulating the clock pulse of the opposite phase at a position of a pulse superimposed by an opposite polarity in accordance with the logic of transmit data and transmitting the modulated clock pulse to the second signal line. The data storage device includes a unit for rectifying the voltage of the first and second signal lines and supplying source voltage to the data storage device, a unit for extracting a clock in the device on the basis of the first signal line and a data demodulating unit for detecting the position of the pulse superimposed by the opposite polarity that is transmitted to the second signal line using the clock in the device.

According to the above-described constitution, since the modulated signal is a total amplitude signal representing a logical value by the time position of the pulse with a narrow width superimposed on the clock pulse of the opposite phase, a demodulation process can be performed by a logic circuit without requiring an edge detecting type demodulation method. Thus, data can be extracted without receiving the influence of internal power source noise due to a timing skew between two-wire transmit signals. Further, since the demodulating circuit of the data storage device can be more simply formed than that of a related art, merit is large in view of cost. Further, since the structure of the controller does not need ternary voltage values like the related art, an adjustment that takes unevenness in an equivalent resistance of the data storage device into consideration is not necessary. Thus, a burden in design can be reduced.

A two-wire type data communication system according to the present invention defined in claim 11 concerns a data communication system for performing a data communication and supplying clocks and electric power by a first signal line and a second signal line between a controller and a data storage device. The controller includes a unit for forming clock pulses of a positive phase and an opposite phase and a unit for modulating the clock pulse of the positive phase and the clock pulse of the opposite phase by the change of a duty ratio in accordance with the logic of transmit data and transmitting the modulated clock pulses respectively to the first signal line and the second signal line. The data storage device includes a unit for rectifying the voltage of the first and second signal lines and supplying source voltage to the data storage device, a unit for extracting a clock in the device on the basis of the first signal line and a data demodulating unit for detecting the change of the duty ratio of the clock pulse of the opposite phase transmitted by the second signal line using the clock in the device.

According to the above-described constitution, since the modulated signal is a total amplitude signal representing a logical value by the duty ratio of the clock pulse, a demodulation process can be performed by a logic circuit without requiring an edge detecting type demodulation method. Thus, data can be extracted without receiving the influence of internal power source noise due to a timing skew between two-wire transmit signals. Further, since the demodulating circuit of the data storage device can be more simply formed than that of a related art, merit is large in view of cost. Further, since the structure of the controller does not need ternary voltage values like the related art, an adjustment that takes unevenness in an equivalent resistance of the data storage device into consideration is not necessary. Thus, a burden in design can be reduced.

A controller according to the present invention defined in claim 12 concerns a controller for performing a data communication and supplying clocks and electric power by a first signal line and a second signal line between a data storage device and the controller. The controller includes a unit for forming clock pulses of a positive phase and an opposite phase, a unit for transmitting the clock pulse of the positive phase to the first signal line and a unit for modulating the clock pulse of the opposite phase depending on the presence or absence of a pulse in accordance with the logic of transmit data and transmitting the modulated clock pulse to the second signal line.

According to the above-described constitution, since the modulated signal is a total amplitude signal representing a logical value by the presence or absence of the clock pulse, a demodulation process can be performed by a logic circuit without requiring an edge detecting type demodulation method and a data demodulation substantially having no erroneous demodulation due to the influence of a skew between signals can be achieved. Further, since ternary voltage values like the related art are not required, an adjustment that takes unevenness in an equivalent resistance of the data storage device into consideration is not necessary. Thus, a burden in design can be reduced.

A controller according to the present invention defined in claim 13 concerns a controller for performing a data communication and supplying clocks and electric power by a first signal line and a second signal line between a data storage device and the controller. The controller includes a unit for forming clock pulses of a positive phase and an opposite phase, a unit for transmitting the clock pulse of the positive phase to the first signal line and a unit for modulating the clock pulse of the opposite phase depending on the change of a delay time relative to the clock pulse of the positive phase in accordance with the logic of transmit data and transmitting the modulated clock pulse to the second signal line.

According to the above-described constitution, since the modulated signal is a total amplitude signal representing a logical value by change of the delay time of the clock pulse, a demodulation process can be performed by a logic circuit without requiring an edge detecting type demodulation method. Thus, data can be extracted without receiving the influence of internal power source noise due to a timing skew between two-wire transmit signals. Further, since ternary voltage values like the related art are not required, an adjustment that takes unevenness in an equivalent resistance of the data storage device into consideration is not necessary. Thus, a burden in design can be reduced.

A controller according to the present invention defined in claim 14 concerns a controller for performing a data communication and supplying clocks and electric power by a first signal line and a second signal line between a data storage device and the controller. The controller includes a unit for forming clock pulses of a positive phase and an opposite phase, a unit for transmitting the clock pulse of the positive phase to the first signal line and a unit for modulating the clock pulse of the opposite phase by the change of a duty ratio in accordance with the logic of transmit data and transmitting the modulated clock pulse to the second signal line.

According to the above-described constitution, since the modulated signal is a total amplitude signal representing a logical value by the change of the duty ratio of the clock pulse, a demodulation process can be performed by a logic circuit without requiring an edge detecting type demodulation method. Thus, data can be extracted without receiving the influence of internal power source noise due to a timing skew between two-wire transmit signals. Further, since ternary voltage values like the related art are not required, an adjustment that takes unevenness in an equivalent resistance of the data storage device into consideration is not necessary. Thus, a burden in design can be reduced.

A controller according to the present invention defined in claim 15 concerns a controller for performing a data communication and supplying clocks and electric power by a first signal line and a second signal line between a data storage device and the controller. The controller includes a unit for forming clock pulses of a positive phase and an opposite phase, a unit for transmitting the clock pulse of the positive phase to the first signal line and a unit for modulating the clock pulse of the opposite phase at a position of a pulse superimposed by an opposite polarity in accordance with the logic of transmit data and transmitting the modulated clock pulse to the second signal line.

According to the above-described constitution, since the modulated signal is a total amplitude signal representing a logical value by the time position of the pulse with a narrow width superimposed on the clock pulse of the opposite phase, a demodulation process can be performed by a logic circuit without requiring an edge detecting type demodulation method. Thus, data can be extracted without receiving the influence of internal power source noise due to a timing skew between two-wire transmit signals. Further, since ternary voltage values like the related art are not required, an adjustment that takes unevenness in an equivalent resistance of the data storage device into consideration is not necessary. Thus, a burden in design can be reduced.

A controller according to the present invention defined in claim 16 concerns a controller for performing a data communication and supplying clocks and electric power by a first signal line and a second signal line between a data storage device and the controller. The controller includes a unit for forming clock pulses of a positive phase and an opposite phase and a unit for modulating the clock pulse of the positive phase and the clock pulse of the opposite phase by the change of a duty ratio in accordance with the logic of transmit data and transmitting the modulated clock pulses respectively to the first signal line and the second signal line.

According to the above-described constitution, since the modulated signal is a total amplitude signal representing a logical value by the duty ratio of the clocks pulses, a demodulation process can be performed by a logic circuit without requiring an edge detecting type demodulation method. Thus, data can be extracted without receiving the influence of internal power source noise due to a timing skew between two-wire transmit signals. Further, since ternary voltage values like the related art are not required, an adjustment that takes unevenness in an equivalent resistance of the data storage device into consideration is not necessary. Thus, a burden in design can be reduced.

A data storage device according to the present invention defined in claim 17 concerns a data storage device for performing a data communication and supplying clocks and electric power by a first signal line and a second signal line between a controller and the data storage device. The data storage device includes a unit for rectifying the voltage of the first and second signal lines and supplying source voltage to the data storage device, a unit for extracting a clock in the device on the basis of the first signal line and a data demodulating unit for detecting the presence or absence of the clock pulse of the opposite phase transmitted by the second signal line using the clock in the device.

According to the above-described constitution, since the modulated signal is a total amplitude signal representing a logical value by the presence or absence of the clock pulse, a demodulation process can be performed by a logic circuit without requiring an edge detecting type demodulation method. Further, a data demodulation substantially having no erroneous demodulation due to the influence of a skew between signals can be realized. Further, since the demodulating circuit can be more simply formed than that of a related art, an advantage is high in view of cost.

A data storage device according to the present invention defined in claim 18 concerns a data storage device for performing a data communication and supplying clocks and electric power by a first signal line and a second signal line between a controller and the data storage device. The data storage device includes a unit for rectifying the voltage of the first and second signal lines and supplying source voltage to the data storage device, a unit for extracting a clock in the device on the basis of the first signal line and a data demodulating unit for detecting the change of the delay time of the clock pulse of the opposite phase transmitted by the second signal line using the clock in the device.

According to the above-described constitution, since the modulated signal is a total amplitude signal representing a logical value by the change of the delay time of the clock pulse, a demodulation process can be performed by a logic circuit without requiring an edge detecting type demodulation method. Thus, data can be extracted without receiving the influence of internal power source noise due to a timing skew between two-wire transmit signals. Further, since the demodulating circuit can be more simply formed than that of a related art, an advantage is high from the viewpoint of cost.

A data storage device according to the present invention defined in claim 19 concerns a data storage device for performing a data communication and supplying clocks and electric-power by a first signal line and a second signal line between a controller and the data storage device. The data storage device includes a unit for rectifying the voltage of the first and second signal lines and supplying source voltage to the data storage device, a unit for extracting a clock in the device on the basis of the first signal line and a data demodulating unit for detecting the change of the duty ratio of the clock pulse transmitted by the second signal line using the clock in the device.

According to the above-described constitution, since the modulated signal is a total amplitude signal representing a logical value by the change of the duty ratio of the clock pulse, a demodulation process can be performed by a logic circuit without requiring an edge detecting type demodulation method. Thus, data can be extracted without receiving the influence of internal power source noise due to a timing skew between two-wire transmit signals. Further, since the demodulating circuit can be more simply formed than that of a related art, an advantage is high from the viewpoint of cost.

A data storage device according to the present invention defined in claim 20 concerns a data storage device for performing a data communication and supplying clocks and electric power by a first signal line and a second signal line between a controller and the data storage device. The data storage device includes a unit for rectifying the voltages of the first and second signal lines and supplying source voltage to the data storage device, a unit for extracting a clock in the device on the basis of the first signal line and a data demodulating unit for detecting the pulse position superimposed by the opposite polarity that is transmitted to the second signal line using the clock in the device.

According to the above-described constitution, since the modulated signal is a total amplitude signal representing a logical value by the time position of the pulse with a narrow width superimposed on the clock pulse of the opposite phase, a demodulation process can be performed by a logic circuit without requiring an edge detecting type demodulation method. Thus, data can be extracted without receiving the influence of internal power source noise due to a timing skew between two-wire transmit signals. Further, since the demodulating circuit can be more simply formed than that of a related art, an advantage is high from the viewpoint of cost.

A data storage device according to the present invention defined in claim 21 concerns a data storage device for performing a data communication and supplying clocks and electric power by a first signal line and a second signal line between a controller and the data storage device. The data storage device includes a unit for rectifying the voltages of the first and second signal lines and supplying source voltage to the data storage device, a unit for extracting a clock in the device on the basis of the first signal line and a data demodulating unit for detecting the change of the duty ratio of the clock pulse of the opposite phase transmitted by the second signal line using the clock in the device.

According to the above-described constitution, since the modulated signal is a total amplitude signal representing a logical value by the duty ratio of the clock pulse, a demodulation process can be performed by a logic circuit without requiring an edge detecting type demodulation method. Thus, data can be extracted without receiving the influence of internal power source noise due to a timing skew between two-wire transmit signals. Further, since the demodulating circuit can be more simply formed than that of a related art, merit is large in view of cost.

DESCRIPTION OF THE PREFERRED EMBODIMENTS

Figure 1:
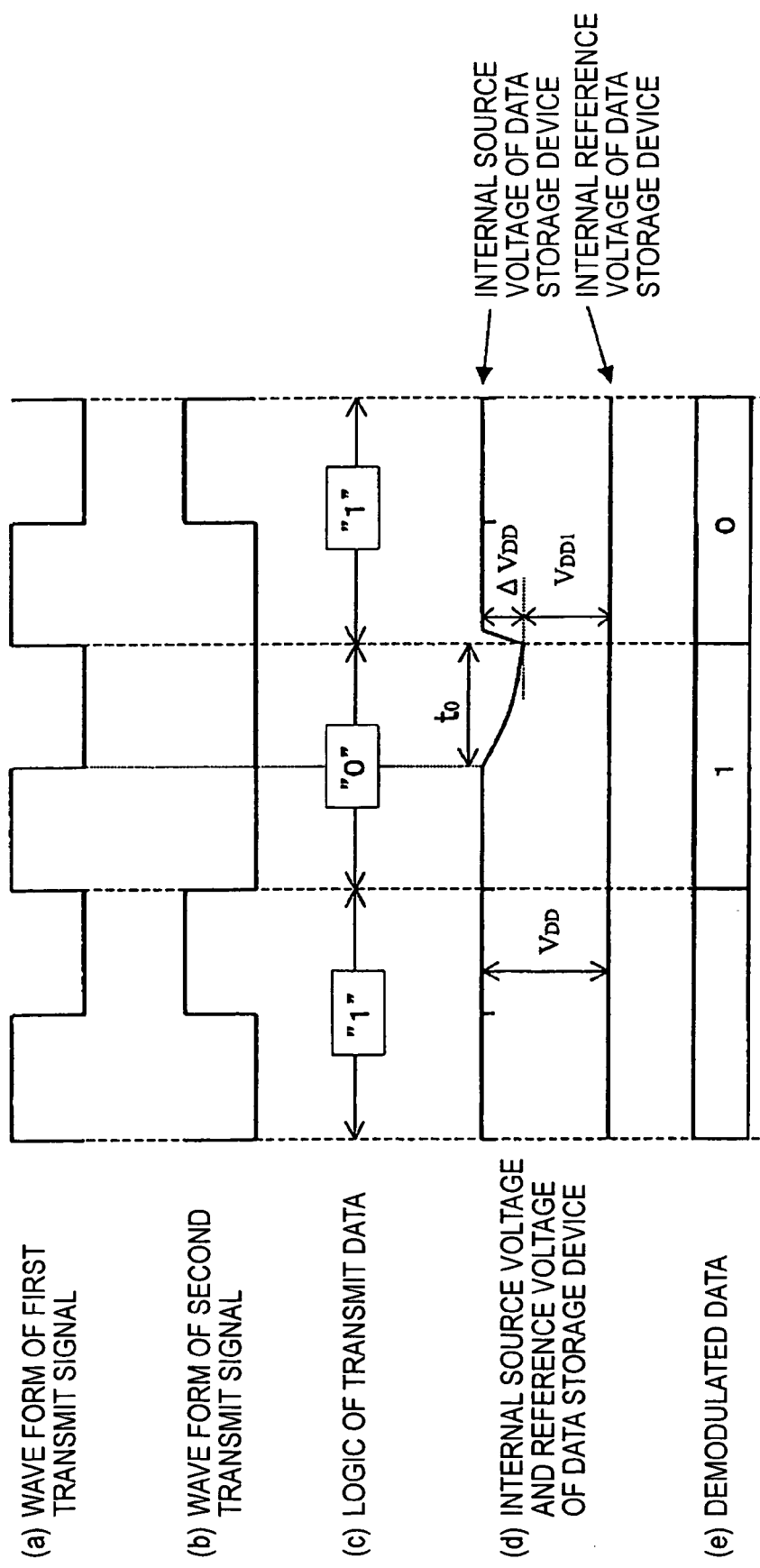
FIG. 1 is a voltage wave form diagram showing a two-wire type data communication method according to a first embodiment of the present invention.

Now, embodiments of the present invention will be described by referring to the drawings. The features of the present invention are all related to a communication during a data communication from a controller to a data storage device. Accordingly, in below-described embodiments, an explanation of the operation of the data communication from the data storage device to the controller is omitted.

First Embodiment

Figure 2:
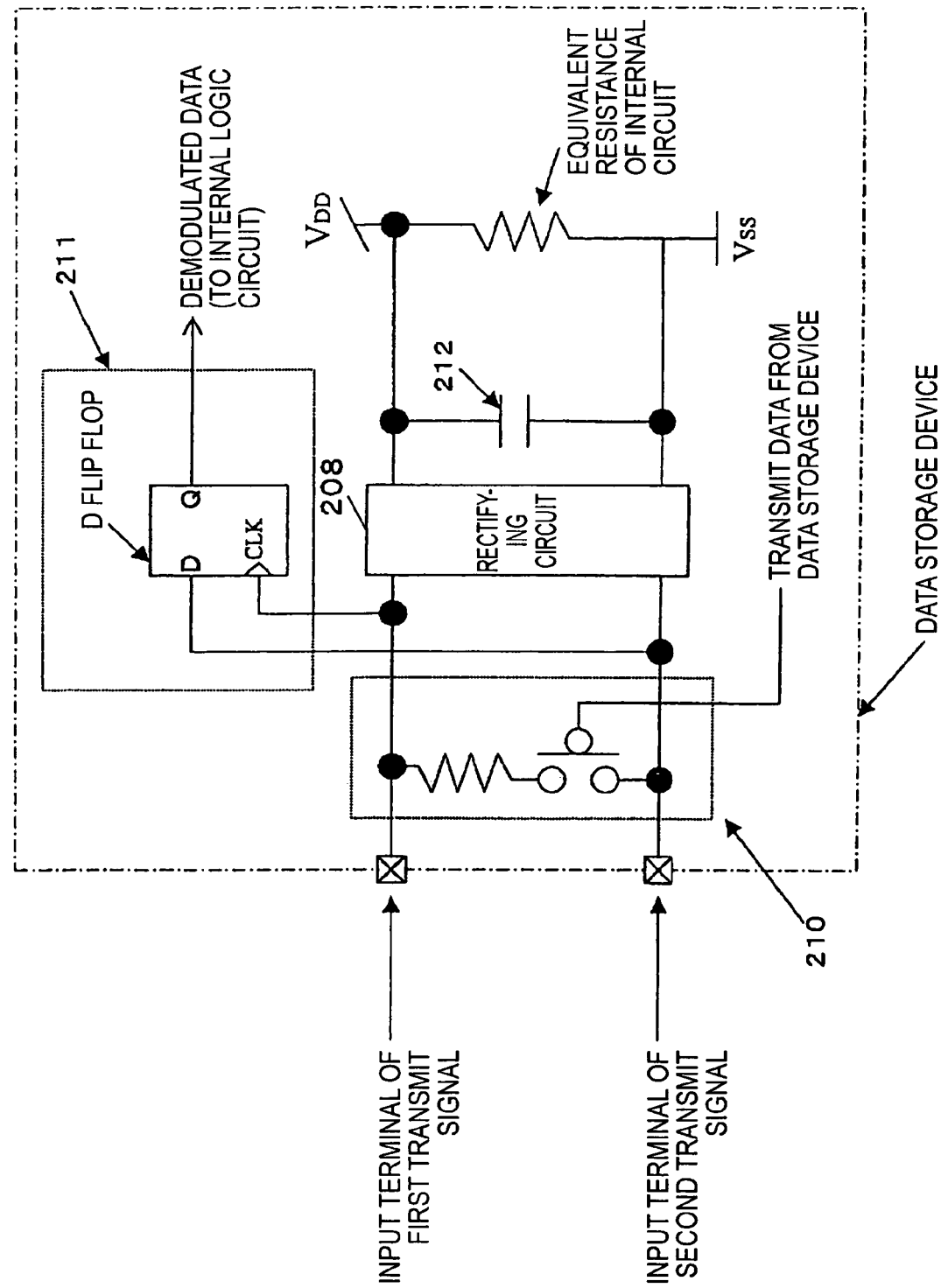
FIG. 2 is a block diagram showing a structural example of a data storage device in a contact type data storage system using the two-wire type data communication method according to the first embodiment of the present invention.

FIG. 1 is a voltage wave form diagram showing a two-wire type data communication method according to a first embodiment of the present invention. FIG. 2 is a block diagram showing a structural example of a data storage device in a contact type data storage system using the two-wire type data communication method according to the first embodiment of the present invention.

The two-wire type data communication method of this embodiment includes a first transmit signal as a stable clock pulse shown in FIG. 1(a) and a second transmit signal obtained by superimposing data on a clock pulse as shown in FIG. 1(b). In a block in which transmit data has a specific logic (In FIG. 1, "1"), the first transmit signal and the second transmit signal have a relation of the clock pulses of opposite phases to each other. In a block in which the transmit data has an opposite logic (In FIG. 1, "0"), the clock pulse is not transmitted to the second transmit signal.

The data storage device receiving the above-described transmit signals firstly forms internal operating voltage by a full-wave rectification of the first and second transmit signals and extracts a stable internal operating clock on the basis of the first transmit signal. Then, the data storage device detects the presence or absence of the clock pulse of the second transmit signal using the internal operating clock to simply demodulate the data as shown in FIG. 1(e).

The data storage device shown in FIG. 2 includes a rectifying circuit 208 for forming internal source voltage from the first and second transmit signals, a data demodulating circuit 211 for extracting receive data from the controller, a smoothing capacity 212 for an internal power source and a second transmitting circuit 210 used when the data is transmitted from the data storage device to the controller.

In the data demodulating circuit 211, the stable clock pulse (FIG. 1(a)) is extracted on the basis of the first transmit signal and the second transmit signal (FIG. 1(b)) is directly latched to a D flip flop by using the leading edge of the clock pulse as an operating clock to extract demodulated data (FIG. 1(e)).

To simplify an explanation, in FIG. 2, the first and second transmit signals are directly inputted to the D flip flop of the data demodulating circuit 211. However, an adjusting circuit is actually required for adjusting a voltage level and a polarity from the first and second transmit signals to reproduce a signal. Further, it is to be understood that a timing adjusting circuit may be possibly required so as not to generate a hold error due to a clock skew.

Further, the data demodulating circuit as a feature of this embodiment detects the presence or absence of the clock pulse of the second transmit signal as data by using the first transmit signal as the internal operating clock. Thus, a circuit structure may be formed that combined logical data such as an exclusive OR of the first and second transmit signals is used as an input signal to the D flip flop of the data demodulating circuit 211.

In the rectifying circuit 208, since the internal source voltage is formed by the full-wave rectification, when the data has the logic of "0" in this embodiment, the pulse is not transmitted to the second transmit signal. Thus, a block is generated in which electric power cannot be supplied during a half cycle of the clock. Accordingly, the smoothing capacity 212 needs to be inserted into an internal power supply circuit to maintain the electric power in this block.

As shown in FIG. 1(d), assuming that source voltage in the data storage device when the first and second transmit signals have opposite phases to each other is VDD, a block in which the electric power cannot be supplied is t0, an equivalent resistance value of the internal circuit of the data storage device is R and the capacity value of the internal power supply circuit is C, a source voltage value VDD1 after time t0 passes is expressed by a following formula.

$$VDD1 = VDD \times (exp(-t0/RC))$$

Accordingly, the capacity value C may be determined so that the VDD1 is not lower than the minimum operating voltage of the internal circuit. When this value is small, even if a capacity element is not specially inserted, only a parasitic capacity of the internal circuit may be sufficient.

In the related art, since data is a small amplitude signal, a demodulation method for detecting the edge of a change point of the signal is employed. Therefore, an erroneous demodulation may be simply generated in accordance with the change of internal source voltage due to a skew between signals. However, in this embodiment, the data signal is a total amplitude signal represented by the presence or absence of the clock pulse, a demodulation process can be performed in a logic circuit without requiring an edge detecting type demodulation method. Thus, the erroneous demodulation due to the influence of the skew between the signals may not be substantially possibly generated.

Further, since the demodulating circuit of the data storage device can be more simply formed than that of the related art, merit is large in view of cost. Further, in the structure of the controller, when a basic clock and the transmit data exist, the second transmit signal can be formed in the simple logic circuit. Ternary voltage values like the related art are not necessary, so that an adjustment that takes unevenness in equivalent resistance of the data storage device into consideration is not required. Thus, a burden in design of the structure of the controller can be reduced.

Second Embodiment

Figure 3:
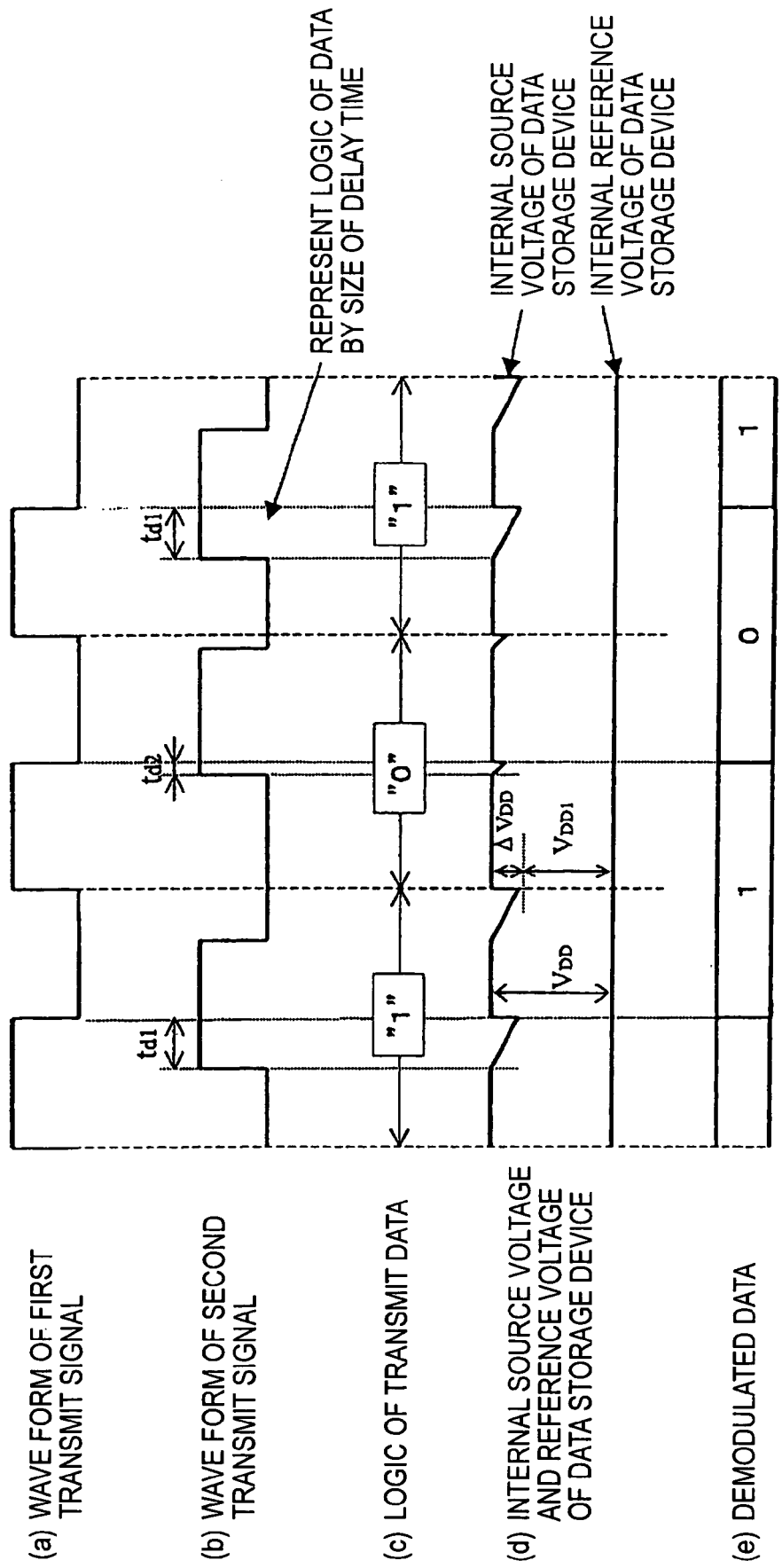
FIG. 3 is a voltage wave form diagram showing a two-wire type data communication method according to a second embodiment of the present invention.
Figure 6:
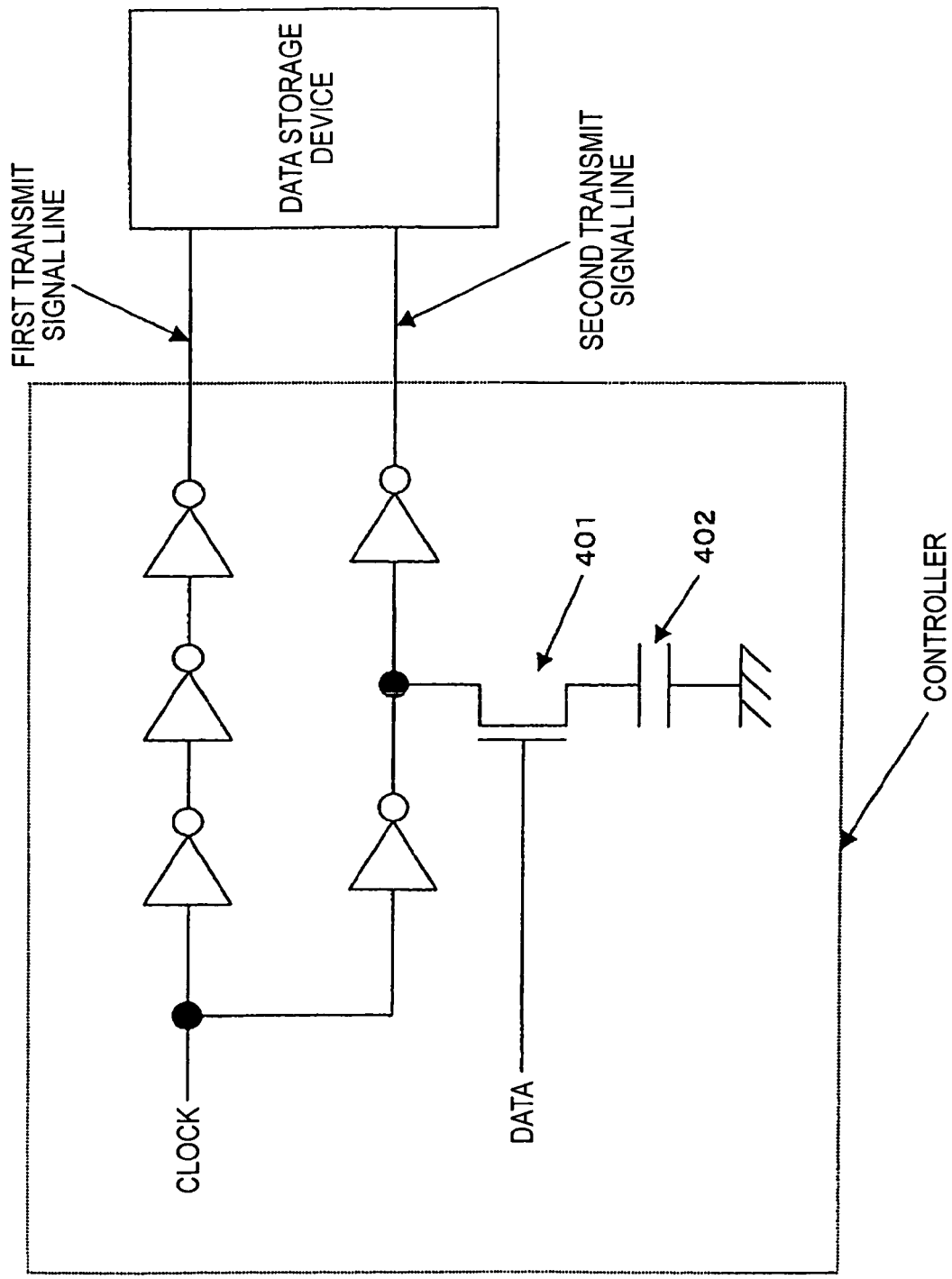
FIG. 6 is a block diagram showing a structural example of a controller in a contact type data storage system using the two-wire type data communication method according to the second embodiment of the present invention.

FIG. 3 is a voltage wave form diagram showing a two-wire type data communication method according to a second embodiment of the present invention. FIG. 6 is a block diagram showing a structural example of a controller in a contact type data storage system using the two-wire type data communication method according to the second embodiment of the present invention.

The two-wire type data communication method of this embodiment includes a first transmit signal as a stable clock pulse shown in FIG. 3(*a*) and a second transmit signal obtained by superimposing data on a clock pulse as shown in FIG. 3(*b*). The first transmit signal and the second transmit signal have a relation of the clock pulses of opposite phases to each other. In the case in which transmit data has a specific logic (In FIG. 3, "1"), the "H" pulse of the second transmit signal advances by time of td1 relative to the "L" pulse of the first signal. In the case in which the transmit data has an opposite logic (In FIG. 3, "0"), the "H" pulse of the second transmit signal advances by time of td2.

A data storage device receiving the above-described transmit signals firstly forms internal operating voltage by a full-wave rectification of the first and second transmit signals and extracts a stable internal operating clock on the basis of the first transmit signal. Then, the data storage device detects the change of the delay time of the second transmit signal as a data signal using the internal operating clock to simply perform a data modulation as shown in FIG. 3(*e*).

Figure 4:
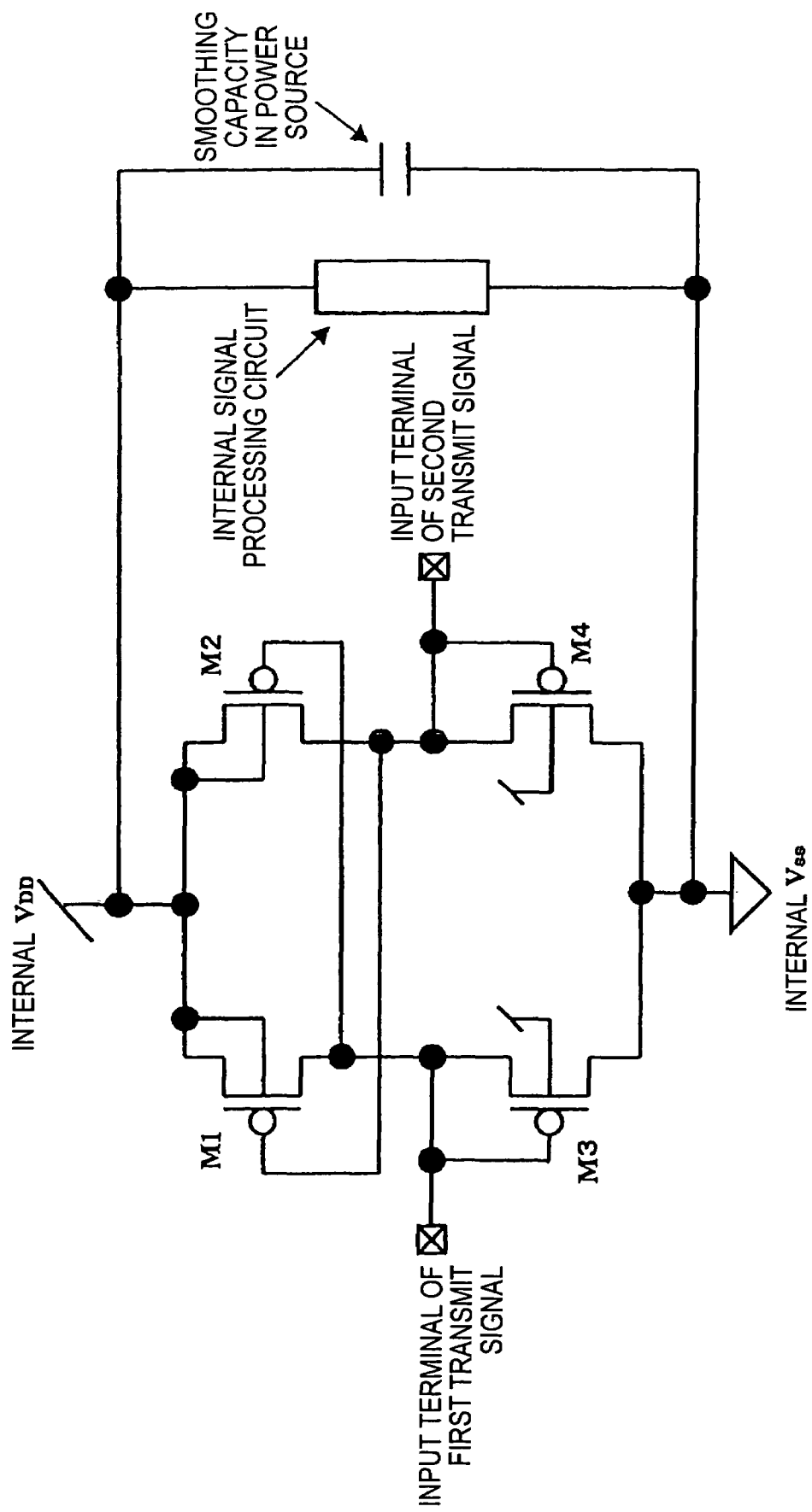
FIG. 4 is a block diagram showing a full-wave rectifying circuit for forming internal operating voltage from first and second transmit signals.
Figure 5:
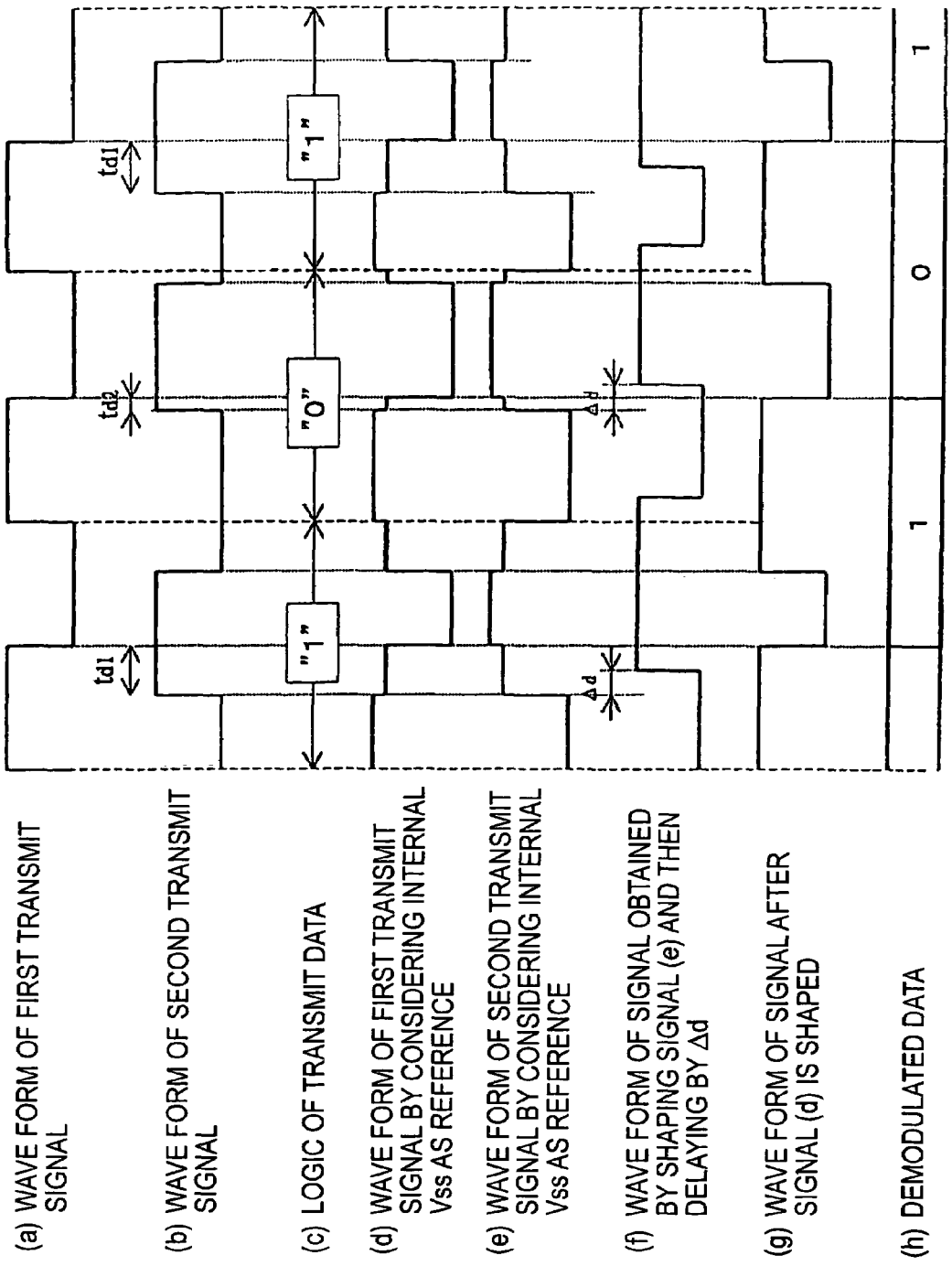
FIG. 5 is a voltage wave form diagram showing the formed internal operating voltage.

An operation during this time is explained by referring to FIGS. 4 and 5. FIG. 4 is one example of a full-wave rectifying circuit for forming the internal operating voltage from the first and second transmit signals. The full-wave rectifying circuit is composed of Pch MOS transistors M1 to M4. FIG. 5 is a voltage wave form diagram for explaining an internal operation when an internal power source formed by using the full-wave rectifying circuit having a structure shown in FIG. 4.

Firstly, in the full-wave rectifying circuit shown in FIG. 4, when "H" voltage is applied to the input terminal of the second transmit signal and "L" voltage is applied to the input terminal of the first transmit signal, electric current flows into an internal VDD through an M2 from the input terminal of the second transmit signal. Then, the electric current flows out to the input terminal of the first transmit signal through an M3 from an internal Vss. At this time, M1 and M4 are turned off.

Then, when the applied voltage of the input terminal of the second transmit signal changes from "H" to "L", the potential of the internal VDD is clamped to the second transmit signal terminal through the M2. Thus, the voltages of the first and second transmit signal input terminals have substantially the same potential (there is a difference of voltage of about Vt of the M2 transistor between them). Voltage between the internal VDD and the internal Vss is held by a smoothing capacity in the power source for a prescribed period. Accordingly, the internal Vss potential is lowered in accordance with the change of the applied voltage of the second transmit signal input terminal. Therefore, when the voltage changes of the first and second transmit signal input terminals are viewed by considering the internal Vss to be a reference, the wave form of the input of the first transmit signal conversely changes from "L" to "H", the wave form of the input of the second transmit signal remains to be "H". Under this state, when the voltage of the input terminal of the first transmit signal changes from "L" to "H", the wave form of the input of the second transmit signal upon considering the internal Vss to be the reference changes from "H" to "L".

Subsequently, when the voltage of the second transmit signal input terminal changes from "L" to "H" from a condition that the voltage of the first transmit signal input terminal is in a state of "H" and the voltage of the second transmit signal input terminal is in a state of "L" (M1 and M4 are turned on, and M2 and M3 are turned off), the internal VDD potential is clamped to the voltage of the first transmit signal input terminal through the M1 and remains to be substantially the same potential (there is a difference of voltage of about Vt of the M1 transistor). Thus, the wave form of the input of the second transmit signal when the internal Vss is considered to be the reference changes from "L" to "H" like the change of the voltage of the terminal. Under this state, when the voltage of the first transmit signal input terminal changes from "H" to "L", since the internal VDD potential is clamped to the voltage of the second transmit signal input terminal through the M2, the wave form of the input of the first transmit signal upon considering the internal Vss to be the reference also changes from "H" to "L".

The above-described operation is shown in the wave form diagram in FIG. 5. When the internal Vss is considered to be the reference, the wave form (a) of the first transmit signal and the wave form (b) of the second transmit signal are respectively shown as wave forms (d) and (e). Here, an internal signal (d) is shaped to obtain an operating clock (g) A signal (f) obtained by delaying an internal signal (e) by Δd is latched at a fall timing of the internal signal so that demodulated data (h) can be obtained. The delay time Δd may be set so that td1 −Δd satisfies the set up time of a latching flip-flop and |td2−Δd| (when td2 is a minus value, −td2+Δd) satisfies a hold time.

In FIG. 5, the fall timing of the extracted operating clock (g) synchronizes with the fall timing of the wave form (a) of the first transmit signal. The fall timing of the wave form (e) of the signal also synchronizes with the rise timing of the first transmit signal (a). Thus, the operating clock may be formed from the wave form (e) of the signal. In this case, a signal obtained by delaying the wave form (d) of the signal by Δd is latched as data so that the demodulated data can be obtained at the rise timing of the first transmit signal (a).

This embodiment is described by using the rectifying circuit having the structure shown in FIG. 4. However, the structure of the rectifying circuit is changed so that the changing timings of the waveform (d) of the first transmit signal or the wave form (e) of the second transmit signal when the internal Vss is considered to be the reference may be different from those of the above explanation. Thus, a method for extracting each internal signal needs to be adjusted in accordance with the structure of the rectifying circuit.

Since the circuit structure of the data storage device in this embodiment may be basically the same as the data storage device of the first embodiment shown as a circuit image in FIG. 2, the detailed description thereof is omitted. In this case, the second transmit signal is latched to a D flip flop by the trailing edge of the clock pulse as the first transmit signal so that data can be demodulated. Further, as described in the explanation of the operation in FIG. 5, a circuit for delaying an input signal to the D flip flop by Δd is required.

In the controller shown in FIG. 6, a three-stage inverter circuit is connected in series to a reference clock to form the first transmit signal (FIG. 3(a)). A two-stage inverter circuit is connected in series to the reference clock to form the second transmit signal (FIG. 3(b)). To delay the second transmit signal in accordance with the logic of data to be transmitted, a transistor switch 401 and a delaying capacitor 402 for switching the wiring load of the inverter circuit are provided.

In the controller constructed as described above, initially, a clock pulse passing the three stages of the inverter circuit from the reference clock is outputted to a first transmit signal line. When the transmit data has a logic of "1", "L" voltage is applied to the gate of the transistor switch 401 to turn off the transistor switch 401 and a clock pulse passing the two stages of the inverter circuit is outputted to a second transmit signal line from the reference clock. At this time, the second transmit signal is outputted more rapidly by one stage of the inverter circuit (td1 of FIG. 3) more rapidly than the first signal.

Then, when the transmit data has a logic of "0", "H" voltage is applied to the gate of the transistor switch 401 to turn on the transistor switch 401. The output wiring load of the first stage of the inverter circuit from the input of the reference clock is increased by the delaying capacitor 402. As a result, since an output signal to the second transmit signal line is delayed by the part of the delaying capacitor 402 (a part corresponding to a time of td1−td2), the output signal is outputted more rapidly by a time of td2 than the output of the first transmit signal. Inn such a way, the first transmit signal (a) and the second transmit signal (b) shown in FIG. 3 are formed.

In this embodiment, the wiring load is changed by the transistor switch and the delaying capacitor. However, a load of a wiring resistance or a load having the combination of the wiring resistance and the delaying capacitor may be switched by the transistor switch.

Time td1−Δd in FIG. 3 may be determined so as to satisfy the regulation of the set up time of the D flip flop of the data demodulating circuit 211 in FIG. 2 and |td2−Δd| may be likewise determined so as to satisfy the hold time of the D flip flop.

As compared with the method for forming the first and second transmit signals by an ordinary logic circuit, the method according to this embodiment in which the transmit signals are formed by changing a signal delay time due to the change of the wiring load in the intermediate node of the signal has advantages as described below.

In the data storage device, the first and second transmit signals are full-wave rectified to form an internal operating power source. Accordingly, when the first and second transmit signals have the same polarity and are temporarily stopped, that is, when the signals are stopped within the time of skew of td1 or td2 shown in FIG. 3, the source voltage of an internal circuit falls. After that, even when the transmission of the signals are resumed, a process cannot be continuously carried out and the process needs to be recommenced from the beginning.

For instance, when the first and second transmit signals are formed by an output port of a microcomputer and directly outputted, a situation may often arise that an interrupt process of the microcomputer is generated halfway and the transmit signals to the data storage device are stopped for a prescribed time, and then, a process is resumed. When the transmit signals are temporarily stopped, the first and second transmit signals always need to be stopped with opposite polarities. Thus, the burden of the microcomputer is increased.

According to the structure of the controller of the present invention, even when a reference clock is stopped on the way of communication, the first and second transmit signals are stopped with the opposite polarities under a steady state after the delay time of the signal. Thus, a process can be continuously carried out after the reference clock is resumed without fall of the internal source voltage of the data storage device. Accordingly, an excess burden is not advantageously necessary in the processing of the microcomputer.

Since the internal source voltage is formed by the full-wave rectification, times (td1, td2) during which electric power cannot be supplied are generated due to the skew between the signals. Therefore, a smoothing capacity needs to be inserted into the internal power source to maintain the electric power of the blocks. A method for determining the capacity value of the smoothing capacity is the same as that described in the first embodiment. In this embodiment, owing to the skew between the signals (either larger one of td1 or td2), a shorter time than the time t0 in the case of the first embodiment can be realized. Thus, a smaller capacity value may be realized.

Since the related art employs an method for detecting the edge of the change point of the signal because of the data of a small amplitude signal, an erroneous demodulation may be possibly simply generated due to the variation of the internal source voltage due to the skew between the signals. However, in this embodiment, since the data signal is a total amplitude signal represented by the change of the delay time of the clock pulse, a demodulation process can be performed by a logic circuit without requiring the edge detecting type demodulation method. Thus, data can be extracted without receiving the influence of internal power source noise due to a timing skew between two-wire transmit signals.

Further, since the demodulating circuit of the data storage device can be more simply formed than the related art, merit is high in view of cost. Further, since the structure of the controller does not need ternary voltage values like the related art, an adjustment that takes unevenness in an equivalent resistance of the data storage device into consideration is not necessary. Thus, a burden in design can be reduced.

Third Embodiment

Figure 7:
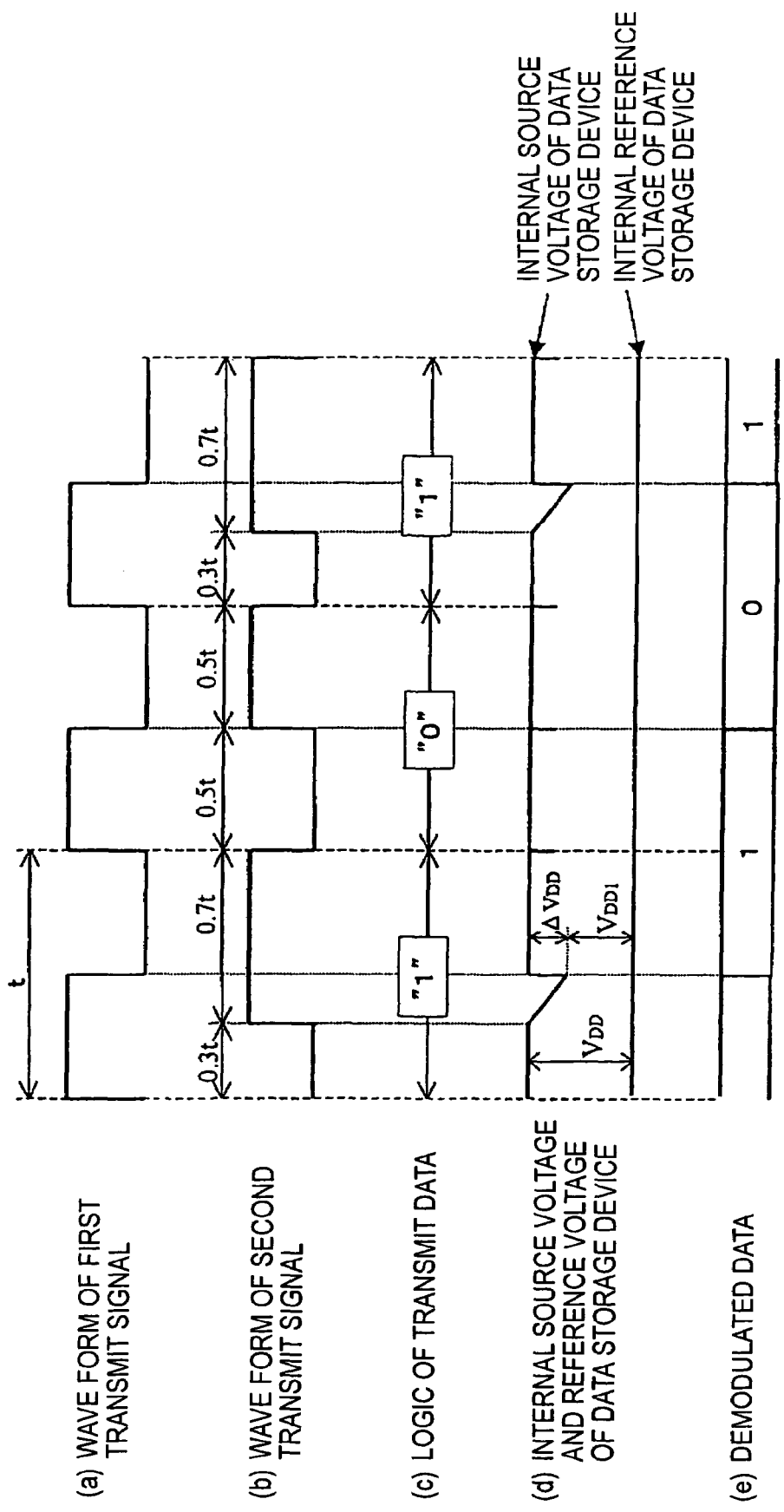
FIG. 7 is a voltage wave form diagram showing a two-wire type data communication method according to a third embodiment of the present invention.
Figure 8:
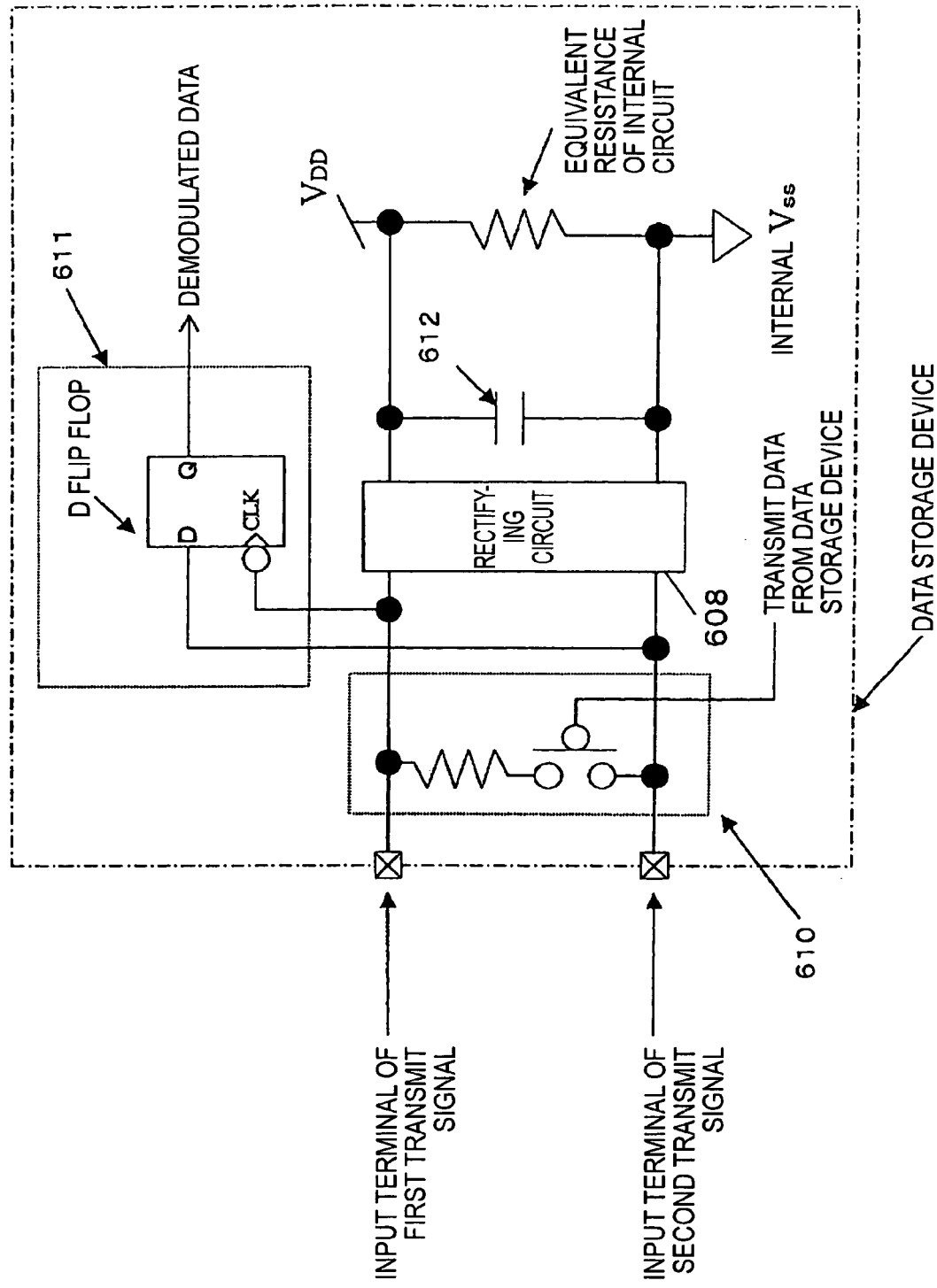
FIG. 8 is a block diagram showing a structural example of a data storage device in a contact type data storage system using the two-wire type data communication method according to the third embodiment of the present invention.

FIG. 7 is a voltage wave form diagram showing a two-wire type data communication method according to a third embodiment of the present invention. FIG. 8 is a block diagram showing a structural example of a data storage device in a contact type data storage system using the two-wire type data communication method according to the third embodiment of the present invention.

The two-wire type data communication method of this embodiment includes a first transmit signal as a stable clock pulse shown in FIG. 7(a) and a second transmit signal as a clock pulse with an opposite phase to that of the first transmit signal as shown in FIG. 7(b) in which the duty ratio of the clock pulse is changed in accordance with the logic of transit data.

The data storage device receiving the above-described transmit signals firstly forms internal operating voltage by a full-wave rectification of the first and second transmit signals and extracts a stable internal operating clock on the basis of the first transmit signal. Then, the data storage device extracts the change of the duty ratio of the clock pulse of the second transmit signal by using the internal operating clock to simply demodulate the data as shown in FIG. 7(e).

The data storage device shown in FIG. 8 includes a rectifying circuit 608 for forming internal source voltage from the first and second transmit signals, a data demodulating circuit 611 for extracting receive data from a controller, a smoothing capacity 612 for an internal power source and a second transmitting circuit 610 used when the data is transmitted from the data storage device to the controller.

In the data demodulating circuit 611, the stable clock pulse (FIG. 7(a)) is extracted on the basis of the first transmit signal and the second transmit signal (FIG. 7(b)) is directly latched to a D flip flop by using the trailing edge of the clock pulse as the operating clock to extract demodulated data (FIG. 7(e)).

In this embodiment, the duty ratio of the clock pulse of the second transmit signal is set to 3:7 when the logic of the transmit data is "1", and the duty ratio is set to 5:5 when the logic of the transmit data is "0". To detect the difference, a signal obtained by delaying the second transmit signal by Δt is latched by the trailing edge of the first transmit signal. The ratio of the duty ratio may be set so as to adequately satisfy the regulations of the set up time and the hold time of the D flip flop when the second transmit signal is latched by the first transmit signal as the clock.

To simplify an explanation, in FIG. 8, the first and second transmit signals are directly inputted to the D flip flop of the data demodulating circuit 611. However, an adjusting circuit is actually required for adjusting a voltage level and a polarity from the first and second transmit signals to reproduce a signal. Further, as described in (the second embodiment), a circuit for delaying an input signal to the D flip flop by Δd is necessary.

Further, the data demodulating circuit as a feature of this embodiment detects the change of the duty ratio of the clock pulse of the second transmit signal as data by using the first transmit signal as the internal operating clock. Thus, a circuit structure may be formed that combined logical data such as an exclusive OR of the first and second transmit signals is used as the input signal to the D flip flop of the data demodulating circuit 611.

Since the internal source voltage is formed by the full-wave rectification, a block (in which the first and second transmit signals do not have opposite phases to each other) is generated in which electric power corresponding to the difference of the duty ratio between the clock pulses of the first transmit signal and the second transmit signal cannot be supplied. Therefore, the smoothing capacity 612 needs to be inserted into the internal power source to maintain the electric power of the block. A method for determining the capacity value of the smoothing capacity is basically the same as that described in the first embodiment. Thus, the explanation thereof is omitted.

Since the related art employs a method for detecting the edge of the change point of the signal because of the data of a small amplitude signal, an erroneous demodulation may be possibly simply generated due to the variation of the internal source voltage due to the skew between the signals. However, in this embodiment, since the data signal is a total amplitude signal represented by the change of the duty ratio of the clock pulse, a demodulation process can be performed by a logic circuit without requiring the edge detecting type demodulation method. Thus, data can be extracted without receiving the influence of internal power source noise due to a timing skew between two-wire transmit signals.

Further, since the demodulating circuit of the data storage device can be more simply formed than the related art, merit is high in view of cost. Further, since the structure of a controller does not need ternary voltage values like the related art and uses the total amplitude signal, the controller can be simply formed by the logic circuit. Thus, a burden in design is reduced.

Fourth Embodiment

Figure 9:
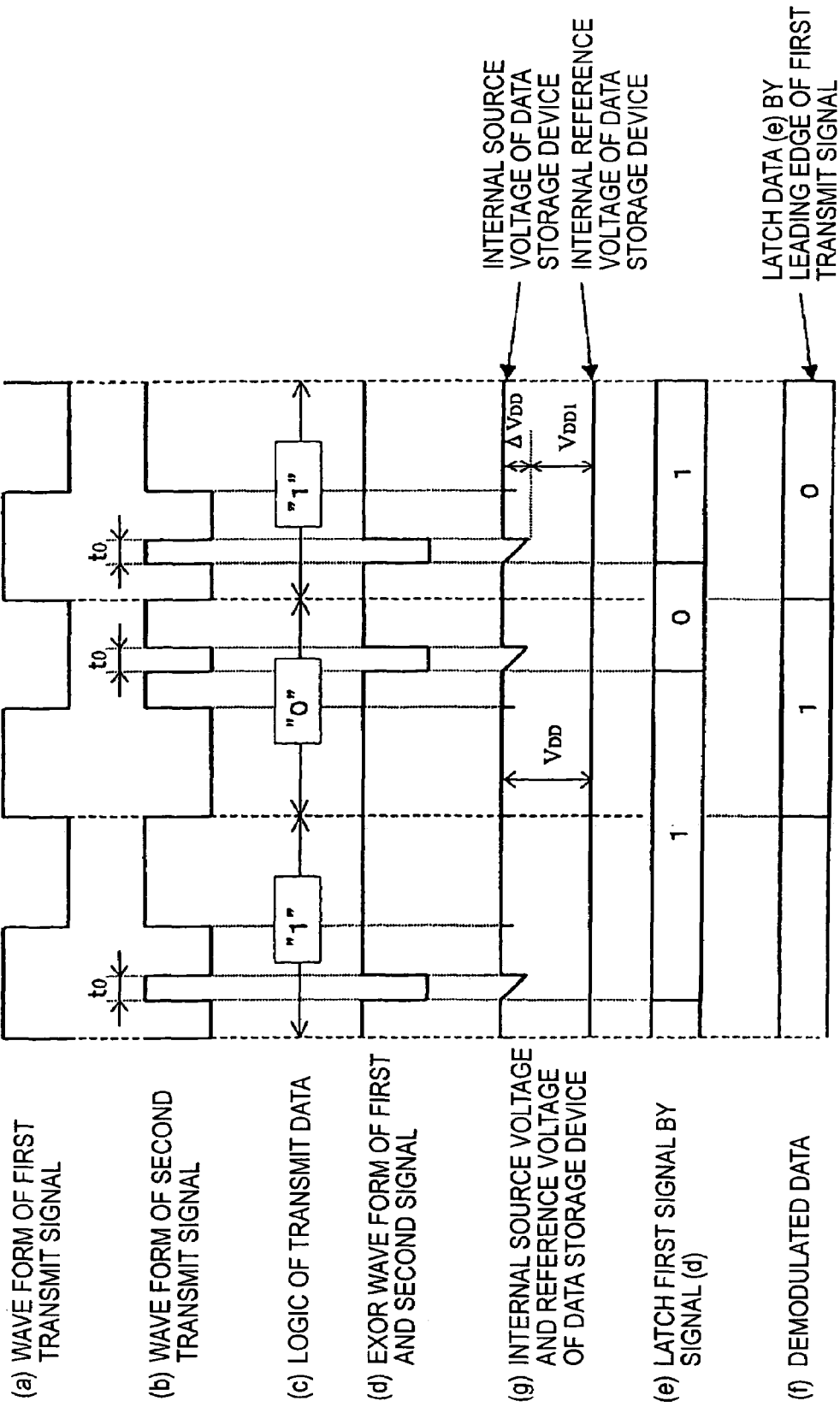
FIG. 9 is a voltage wave form diagram showing a two-wire type data communication method according to a fourth embodiment of the present invention.
Figure 10:
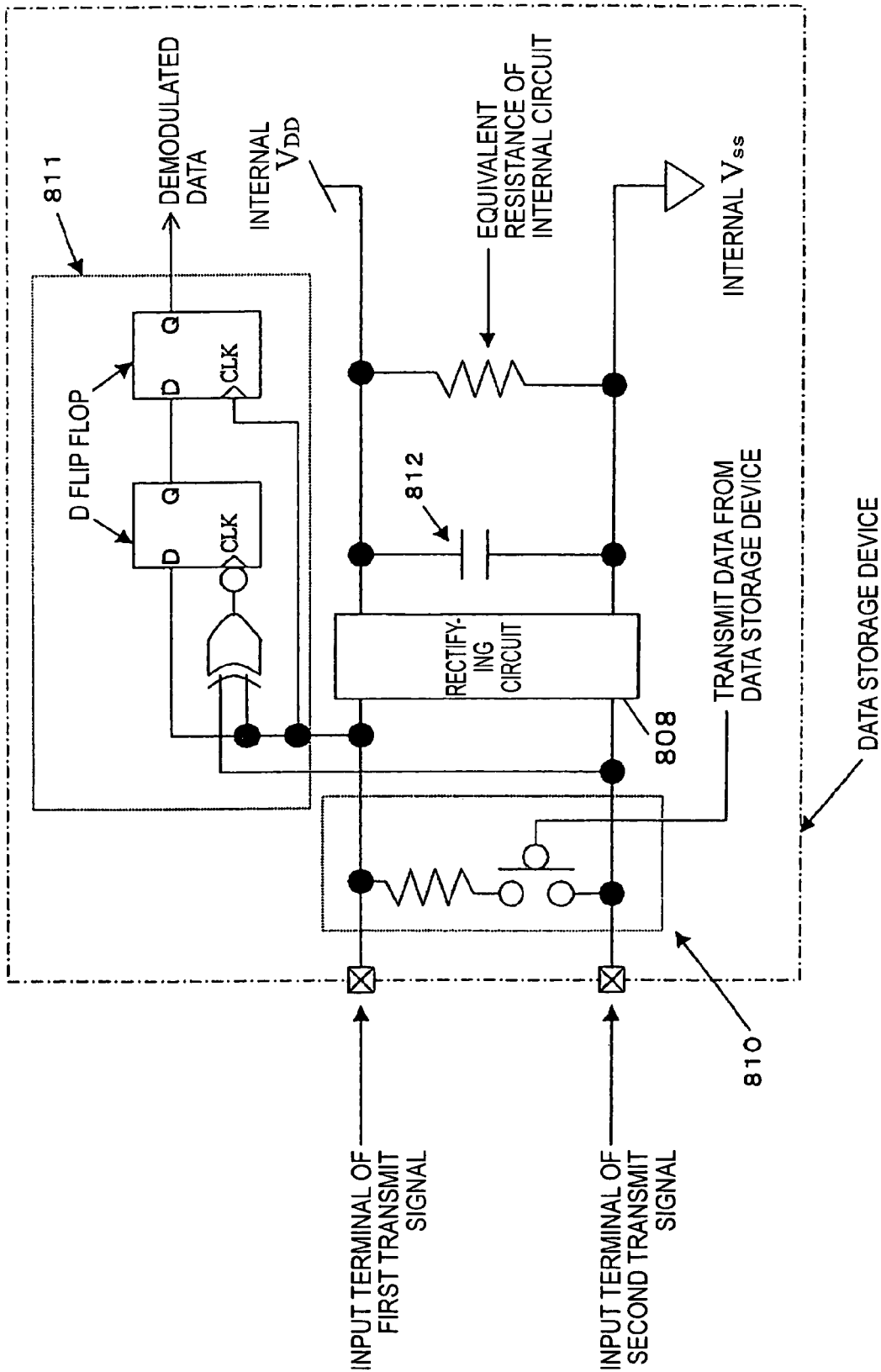
FIG. 10 is a block diagram showing a structural example of a data storage device in a contact type data storage system using the two-wire type data communication method according to the fourth embodiment of the present invention.

FIG. 9 is a voltage wave form diagram showing a two-wire type data communication method according to a fourth embodiment of the present invention. FIG. 10 is a block diagram showing a structural example of a data storage device in a contact type data storage system using the two-wire type data communication method according to the fourth embodiment of the present invention.

The two-wire type data communication method of this embodiment includes a first transmit signal as a stable clock pulse shown in FIG. 9(a) and a second transmit signal as a clock pulse with an opposite phase to that of the first transmit signal as shown in FIG. 9(b) and showing the logical data of "H" or "L" corresponding to the superimposition of a pulse signal with a small time width t0 on the polarity "H" or "L" of the signal.

The data storage device receiving the above-described transmit signals firstly forms internal operating voltage by a full-wave rectification of the first and second transmit signals and extracts a stable internal operating clock on the basis of the first transmit signal. Then, the data storage device extracts the pulse signal with the small time width t0 superimposed on the second transmit signal in accordance with an exclusive OR of the fist and second transmit signals to detect on which polarity of the clock pulse of the first transmit signal the pulse signal is superimposed and process the pulse signal by the internal operating clock extracted on the basis of the first transmit signal. Thus, data can be simply demodulated.

The data storage device shown in FIG. 10 includes a rectifying circuit 808 for forming internal source voltage from the first and second transmit signals, a data demodulating circuit 811 for extracting receive data from a controller, a smoothing capacity 812 for an internal power source and a second transmitting circuit 810 used when the data is transmitted from the data storage device to the controller.

In the data demodulating circuit 811, an exclusive OR signal of the first and second transmit signals is extracted (FIG. 9(d)) and the first transmit signal is latched to a first stage D flip flop using the signal as a clock (FIG. 9(e)). Further, an output of the first stage D flip flop is latched to a next stage D flip flop by the clock pulse extracted on the basis of the first transmit signal to obtain a demodulated data signal (FIG. 9(f)).

To simplify an explanation, in FIG. 10, the first and second transmit signals are directly inputted to the D flip flops and a logical gate of the data demodulating circuit 811. However, an adjusting circuit is actually required for adjusting a voltage level and a polarity from the first and second transmit signals to reproduce a signal. Further, since micro pulses (whiskers) are generated in the exclusive OR of the first and second transmit signals due to a skew between the signals, a filter circuit is actually required. However, for the purpose of simplification, an explanation thereof is omitted.

Since the internal source voltage is formed by the full-wave rectification, electric power cannot be supplied during the small time width of t0 of the pulse signal superimposed on the second transmit signal. Therefore, the smoothing capacity 812 needs to be inserted into the internal power source to maintain the electric power of this block. A method for determining the capacity value of the smoothing capacity is basically the same as that described in the first embodiment. Thus, the explanation thereof is omitted.

Since the related art employs a method for detecting the edge of the change point of the signal because of the data of a small amplitude signal, an erroneous demodulation may be possibly simply generated due to the variation of the internal source voltage due to the skew between the signals. However, in this embodiment, since the data signal is a total amplitude signal represented by the time position of the pulse signal on which the data signal is superimposed, a demodulation process can be performed by a logic circuit without requiring the edge detecting type demodulation method. Thus, data can be extracted without receiving the influence of internal power source noise due to a timing skew between two-wire transmit signals.

Further, since the demodulating circuit of the data storage device can be more simply formed than the related art, merit is high in view of cost. Further, since the structure of the controller does not need ternary voltage values like the related art, an adjustment that takes unevenness in equivalent resistance of the data storage device into consideration is not necessary. Thus, a burden in design can be reduced.

Fifth Embodiment

Figure 11:
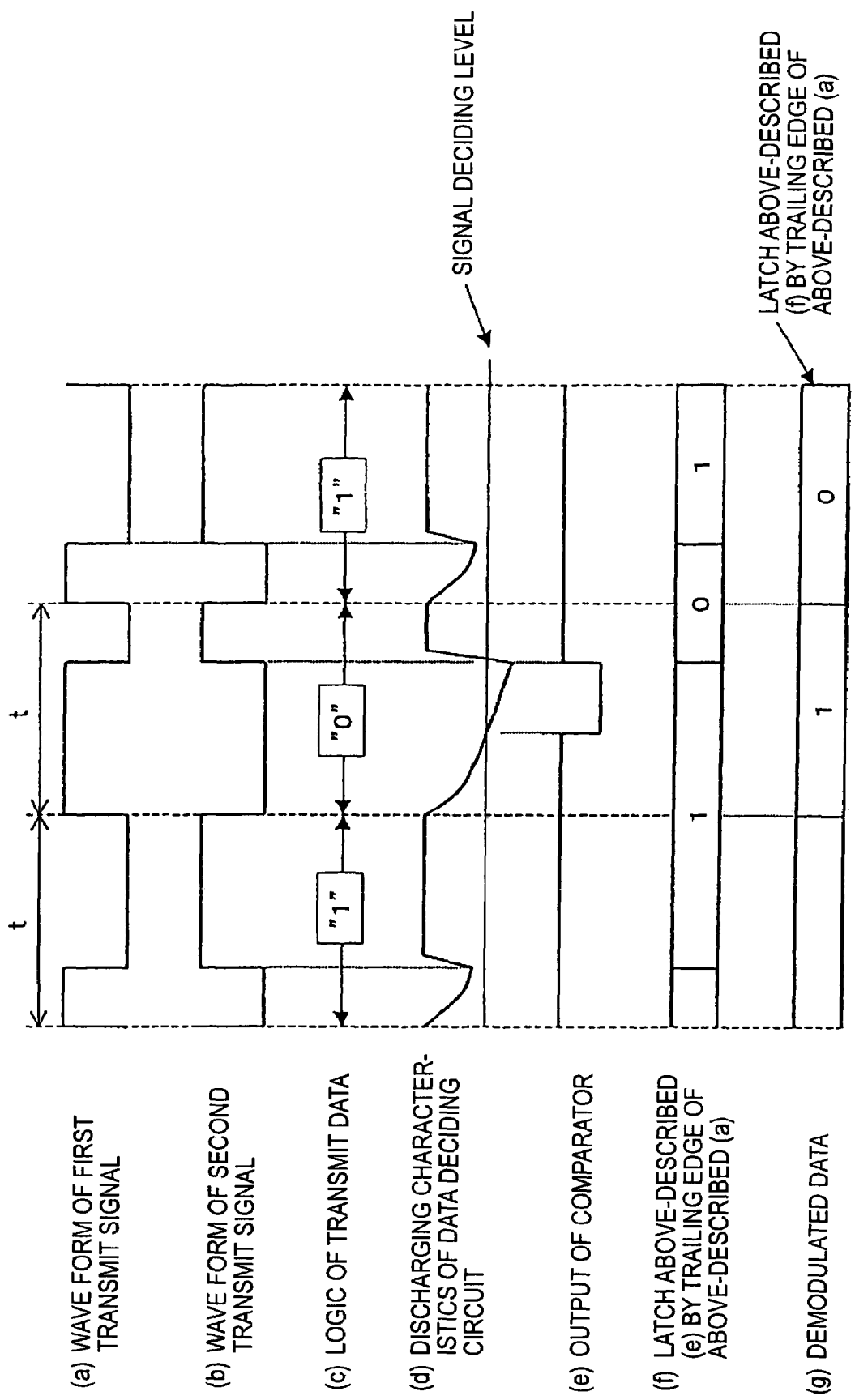
FIG. 11 is a voltage wave form diagram showing a two-wire type data communication method according to a fifth embodiment of the present invention.
Figure 12:
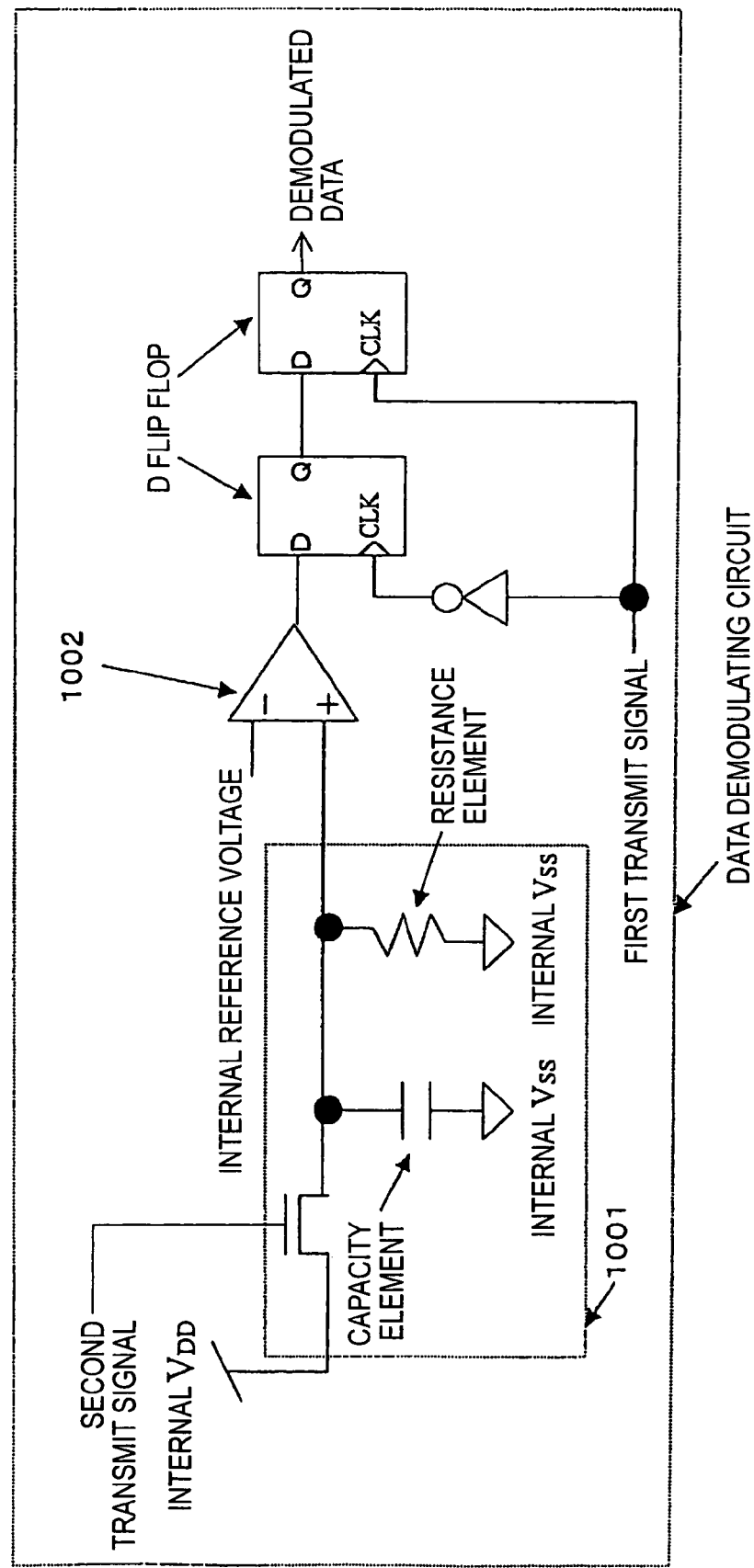
FIG. 12 is a circuit diagram showing a structural example of a data demodulating circuit of a data storage device in a contact type data storage system using the two-wire type data communication method according to the fifth embodiment of the present invention.
Figure 13:
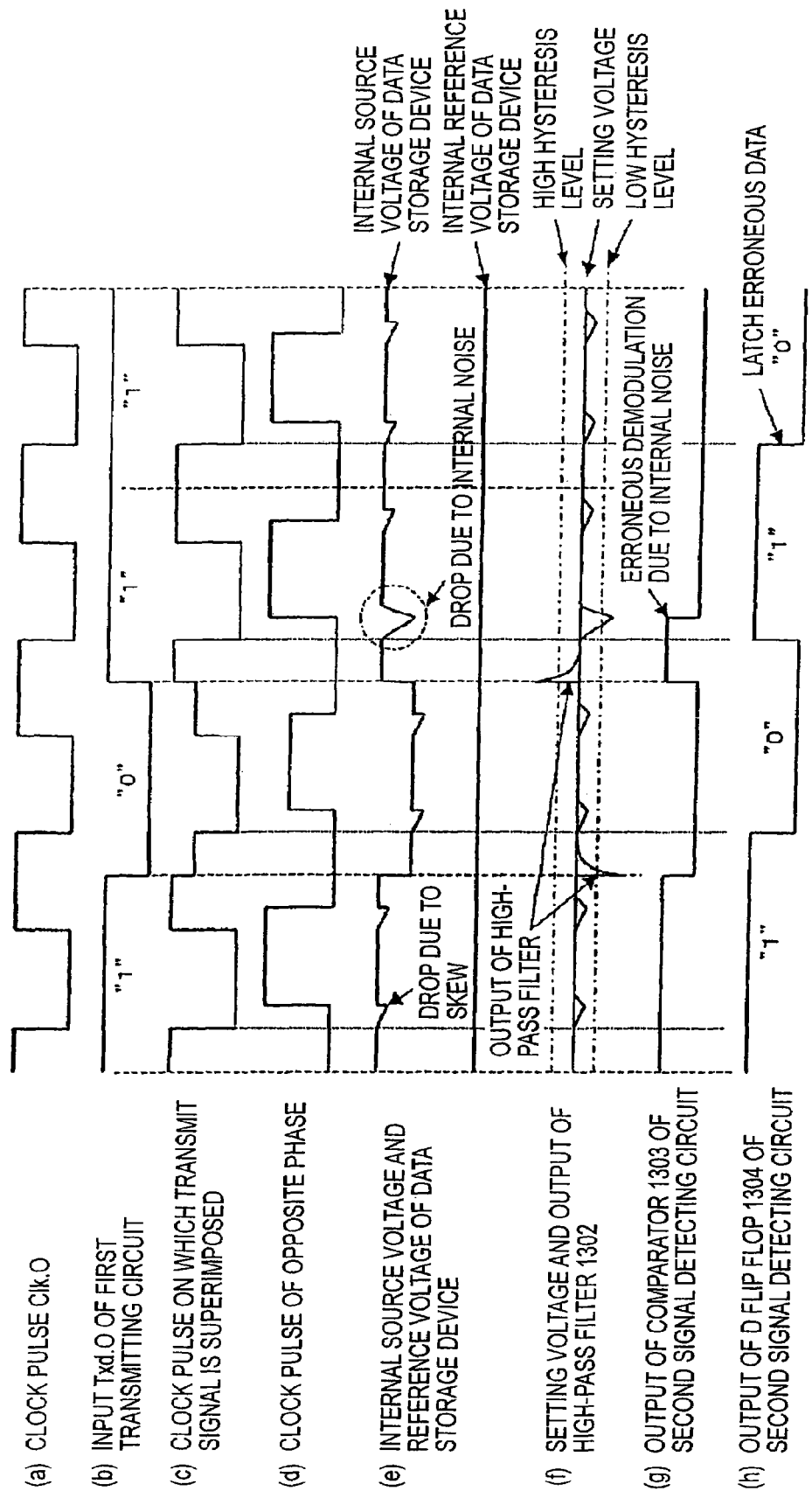
FIG. 13 is a voltage wave form diagram for explaining a usual two-wire type data communication method.
Figure 14:
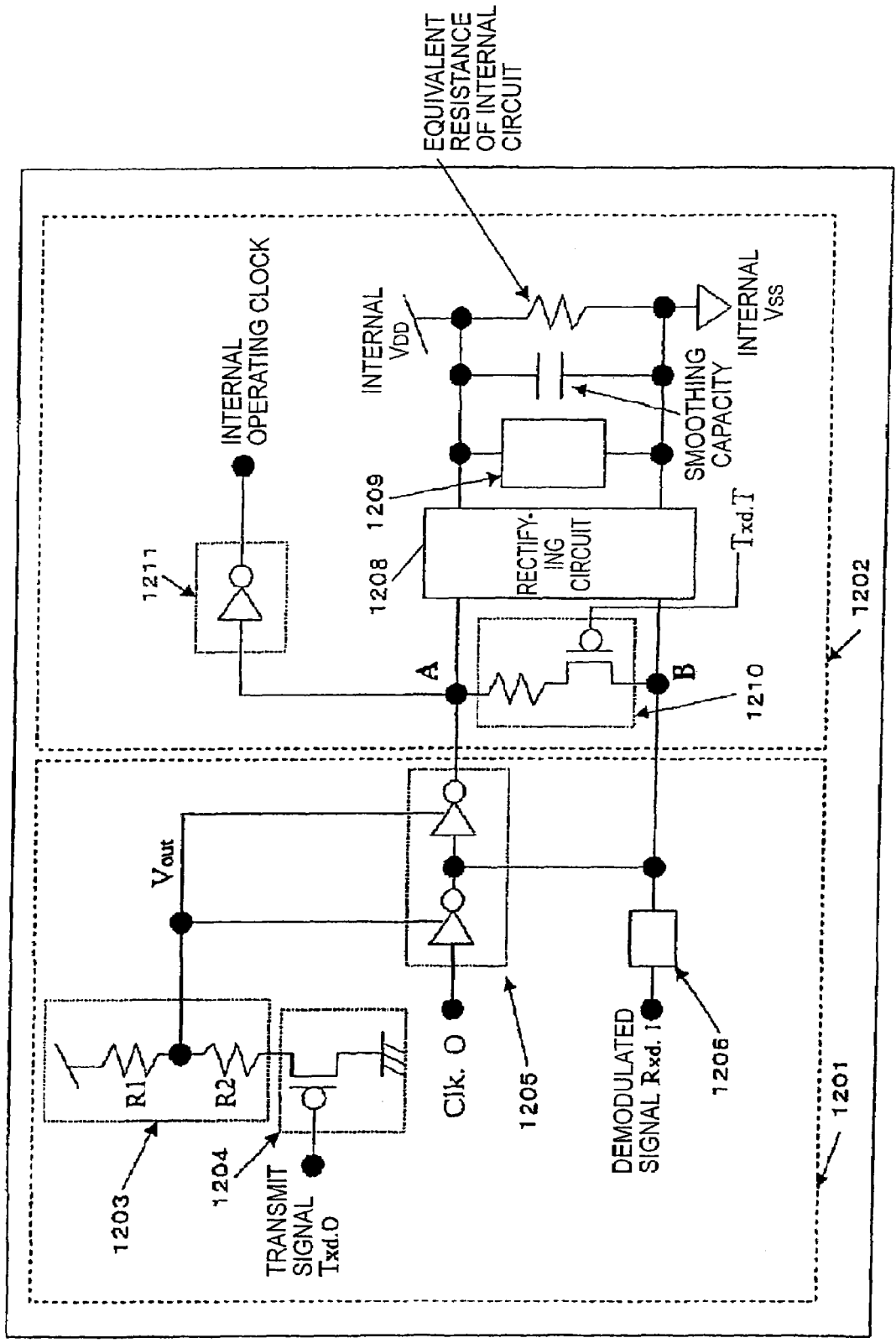
FIG. 14 is a block diagram showing a structural example of a contact type data storage system using the usual two-wire type data communication method.
Figure 15:
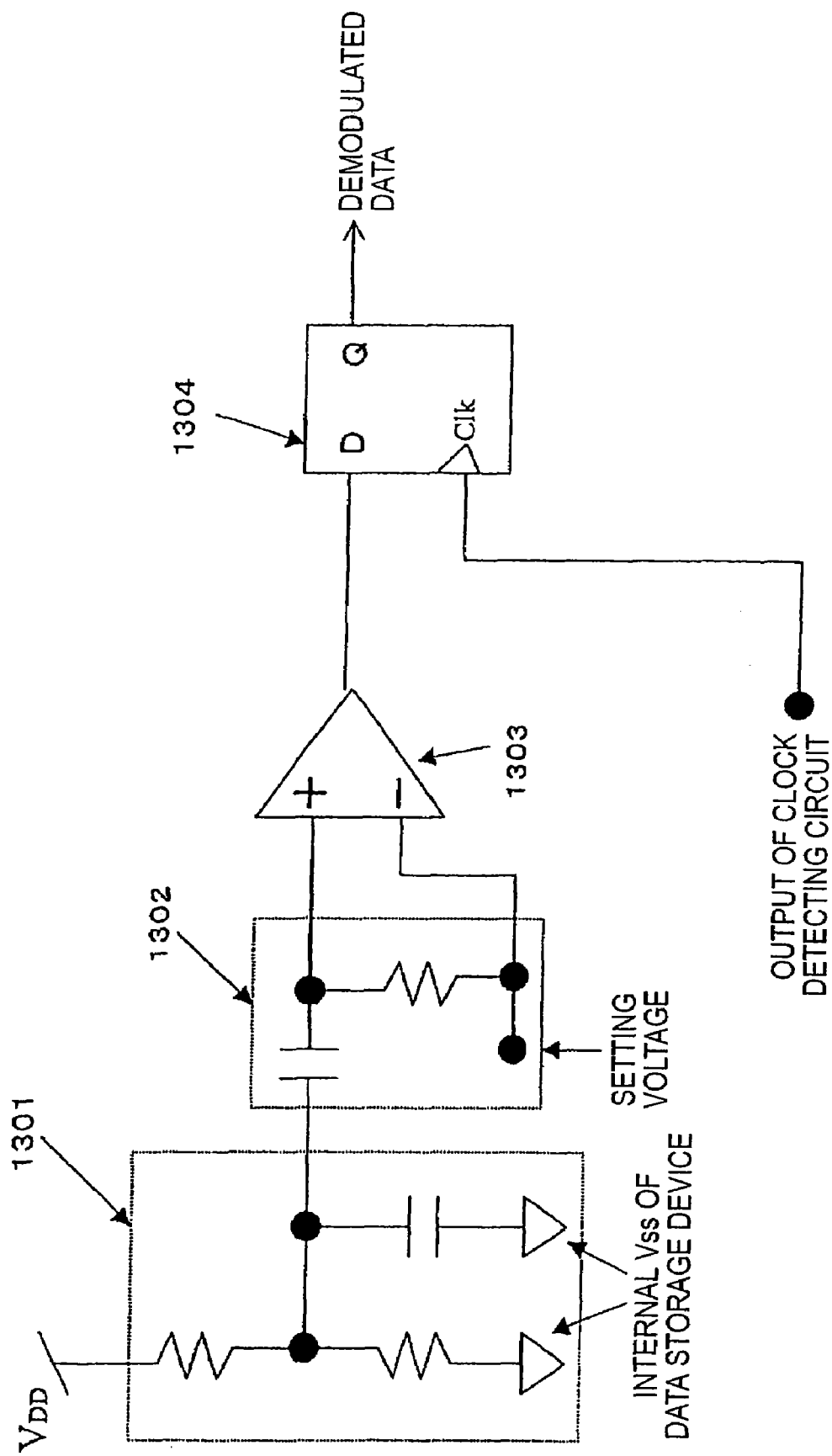
FIG. 15 is a circuit diagram showing a data demodulating circuit of a data storage device in a contact type data storage system using the usual two-wire type data communication method.

FIG. 11 is a voltage wave form diagram showing a two-wire type data communication method according to a fifth embodiment of the present invention. FIG. 12 is a circuit diagram showing a structural example of a data demodulating circuit of a data storage device in a contact type data storage system using the two-wire type data communication method according to the fifth embodiment of the present invention.

The two-wire type data communication method of this embodiment includes a first transmit signal (FIG. 11(a)) as a clock pulse in which a duty ratio is changed in accordance with the logic (FIG. 11(c)) of transmit data and a second transmit signal (FIG. 11(b)) as a clock pulse constantly having an opposite phase to that of the first transmit signal.

The data storage device receiving the above-described transmit signals firstly forms internal operating voltage by a full-wave rectification of the first and second transmit signals and extracts an internal operating clock on the basis of the first transmit signal or the second transmit signal. In this case, while the duty ratio of the first transmit signal or the second transmit signal is changed, a clock period t is maintained to a constant value. Accordingly, as long as the duty ratio is not set to an extreme value, the internal operating clock can be used. Then, data is extracted by the data demodulating circuit having a time deciding function for extracting the change of the duty ratio. The rate of change of the duty ratio is set by taking a range of unevenness in time deciding function into consideration.

The data storage device of this embodiment has the same structure, except the data demodulating circuit, as that of the data storage device shown in FIG. 2 that is described in the first embodiment. Thus, an explanation thereof is omitted. The data demodulating circuit in the data storage device of the embodiment shown in FIG. 12 includes a charging and discharging circuit 1001 for deciding time composed of a transistor switch turned on and off in accordance with the signal polarity of the second transmit signal, a resistance element and a capacity element, a comparator 1002 for comparing the output of the charging and discharging circuit with internal reference voltage and a second-stage D flip flop for latching the output by a clock pulse extracted on the basis of the first transmit signal.

Initially, when the signal polarity of the second transmit signal is "H", the transistor switch is turned on to charge the capacity element of the charging and discharging circuit 1001 from an internal VDD. At this time, the capacity element is charged to voltage near the internal VDD, so that the capacity element has the voltage higher than the internal reference voltage and the output of the comparator 1002 becomes "H".

Then, when the signal polarity of the second transmit signal is "L", the transistor switch is turned off and electric charge with which the capacity element is charged is discharged through the resistance element. When the voltage thereof is lower than the internal reference voltage, the output of the comparator 1002 becomes "L" (FIGS. 11(d) and 11(e)).

Accordingly, when the values of the resistance element and the capacity element are determined so that a discharge time until the output of the charging and discharging circuit 1001 is lower than the internal reference voltage is about half as long as a clock rate, the time of change of the duty ratio of the clock pulse can be decided. In this embodiment, the electric charge with which the capacity element is charged is discharged through the resistance element. However, the electric charge may be discharged by a transistor circuit in place of the resistance element.

After that, the output of the comparator 1002 is latched to the trailing edge of the first transmit signal by the D flip flop (FIG. 11(f)), and then, the output is latched by the leading edge of the first transmit signal to extract demodulated data shaped by time (FIG. 11(g)).

In this embodiment, since there is not intentionally a time in which the first and second transmit signals have the same polarity, the smoothing capacity of the internal power source of the data storage device may have a small capacity value.

Since the related art employs a method for detecting the edge of the change point of the signal because of the data of a small amplitude signal, an erroneous demodulation may be possibly simply generated due to the variation of the internal source voltage due to the skew between the signals. However, in this embodiment, since the data signal is a total amplitude signal represented by the duty ratio of the clock pulse, a demodulation process can be performed by a logic circuit without requiring the edge detecting type demodulation method. Thus, data can be extracted without receiving the influence of internal power source noise due to a timing skew between two-wire transmit signals.

Further, since the structure of the controller does not need ternary voltage values like the related art, an adjustment that takes unevenness in equivalent resistance of the data storage device into consideration is not necessary. Thus, a burden in design can be reduced.

As described above, according to the present invention, a stable two-wire communication can be realized in which the erroneous data demodulation is not generated due to the noise of the internal source voltage caused by the influence of the increase of a skew between the signals or the operation of the internal circuit of the data storage device. Further, since the demodulating circuit of the data storage device can be more simply formed than the related art, merit is high in view of cost. Still further, since the structure of the controller does not need ternary voltage values like the related art, an adjustment that takes unevenness in equivalent resistance of the data storage device into consideration is not necessary. Thus, a burden in design can be reduced.

What is claimed is:

1. A two-wire type data communication method comprising performing a data communication and supplying clocks and electric power by a first signal line and a second signal line between a controller and a data storage device, wherein, among the first signal line and the second signal line for connecting between the controller and the data storage device, a first clock pulse of a first phase having a constant duty ratio and not being modulated is transmitted by the first signal line and a second clock pulse of a second phase modulated in accordance with a logic of transmit data is transmitted by the second signal line, the second phase is opposite of the first phase, an electric power is supplied to the data storage device by a difference of voltage between the first signal line and the second signal line, and the second clock pulse transmitted by the second signal line is formed depending on the presence or absence of a pulse in accordance with the logic of the transmit data.

2. A two-wire type data communication method comprising performing a data communication and supplying clocks and electric power by a first signal line and a second signal line between a controller and a data storage device, wherein, among the first signal line and the second signal line for connecting between the controller and the data storage device, a first clock pulse of a first phase having a constant duty ratio and not being modulated is transmitted by the first signal line and a second clock pulse of a second phase modulated in accordance with a logic of transmit data is transmitted by the second signal line, the second phase is opposite of the first phase, an electric power is supplied to the data storage device by a difference of voltage between the first signal line and the second signal line, and the second clock pulse transmitted by the second signal line is modulated to be delayed, relative to the first clock pulse transmitted by the first signal line, by a first delay time when the transmitted data has a first logic and modulated to be delayed, relative to the first clock pulse transmitted by the first signal line, by a second delay time when the transmitted data has a second logic.

3. The two-wire type data communication method of claim 2, wherein the first delay time is different from the second delay time.

4. The two-wire type data communication method of claim 2, wherein the second clock pulse is modulated to be delayed, relative to the first clock pulse by the first delay time when the transmitted data has a logic one and modulated to be delayed, relative to the first clock pulse, by a second delay time when the transmitted data has a logic zero.

5. The two-wire type data communication method of claim 2, wherein:

when the transmit data has the first logic, a high pulse of the second clock pulse is modulated to be delayed relative to a low pulse of the first clock pulse by the first delay time, and when the transmit data has the second logic, a high pulse of the second clock pulse is modulated to be delayed relative to a low pulse of the first clock pulse by the first delay time.

6. A two-wire type data communication method comprising performing a data communication and supplying clocks and electric power by a first signal line and a second signal line between a controller and a data storage device, wherein, among the first signal line and the second signal line for connecting between the controller and the data storage device, a first clock pulse of a first phase having a constant duty ratio and not being modulated is transmitted by the first signal line and a second clock pulse of a second phase modulated in accordance with a logic of transmit data is transmitted by the second signal line, the second phase is opposite of the first phase, an electric power is supplied to the data storage device by a difference of voltage between the first signal line and the second signal line, and the second clock pulse transmitted by the second signal line is formed by superimposing, at a position having an opposite polarity from the logic of the transmit data, a pulse having the same polarity as the logic of the transmit data.

7. A two-wire type data communication system for performing a data communication and supplying clocks and electric power by a first signal line and a second signal line between a controller and a data storage device, wherein:

the controller of the two-wire type data communication system for performing data communication and supplying clocks and electric power by the first signal line and the second signal line between the controller and the data storage device, comprises:

a forming unit, which forms a first clock pulse of a first phase, the first clock pulse having a constant duty ratio and not being modulated, and a second clock pulse of a second phase, the second phase is opposite of the first phase, a first transmitting unit, which transmits the first clock pulse of the first phase to the first signal line, a modulating unit, which modulates the second clock pulse of the second phase depending on the presence or absence of a pulse in accordance with a logic of transmit data, a second transmitting unit, which transmits the modulated second clock pulse to the second signal line, and the data storage device comprises:

a rectifying unit, which rectifies a difference of voltage of the first and second signal lines, a source voltage supplying unit, which supplies source voltage into the data storage device, an extracting unit, which extracts a clock in the data storage device on the basis of the first signal line, and a data demodulating unit, which detects the presence or absence of the pulse in the second clock pulse transmitted by the second signal line using the clock in the data storage device.

8. A two-wire type data communication system for performing a data communication and supplying clocks and electric power by a first signal line and a second signal line between a controller and a data storage device, wherein:

the controller of the two-wire type data communication system for performing data communication and supplying clocks and electric power by the first signal line and the second signal line between the controller and the data storage device, comprises:

a forming unit, which forms a first clock pulse of a first phase, the first clock pulse having a constant duty ratio and not being modulated, and a second clock pulse of a second phase, the second phase is opposite of the first phase, a first transmitting unit, which transmits the first clock pulse of the first phase to the first signal line, a modulating unit, which modulates the second clock pulse to be delayed, relative to the first clock pulse, by a first delay time when the transmitted data has a first logic and modulates the second clock pulse to be delayed, relative to the first clock pulse, by a second delay time when the transmitted data has a second logic, and a second transmitting unit, which transmits the modulated second clock pulse to the second signal line; and the data storage device comprises:

a rectifying unit, which rectifies a difference of voltage of the first and second signal lines, a source voltage supplying unit, which supplies source voltage into the data storage device, an extracting unit, which extracts a clock in the data storage device on the basis of the first signal line, and a data demodulating unit, which detects the change of the delay time associated with the second clock pulse transmitted by the second signal line using the clock in the data storage device.

9. A two-wire type data communication system for performing a data communication and supplying clocks and electric power by a first signal line and a second signal line between a controller and a data storage device, wherein:

the controller of the two-wire type data communication system for performing data communication and supplying clocks and electric power by the first signal line and the second signal line between the controller and the data storage device, comprises:

a forming unit, which forms a first clock pulse of a first phase, the first clock pulse having a constant duty ratio and not being modulated, and a second clock pulse of a second phase, the second phase is opposite of the first phase, a first transmitting unit, which transmits the first clock pulse to the first signal line, a modulating unit, which modulates the second clock pulse by superimposing, at a position having an opposite polarity from a logic of the transmit data, a pulse having the same polarity as the logic of the transmit data, and a second transmitting unit, which transmits the modulated second clock pulse to the second signal line; and the data storage device comprises:

a rectifying unit, which rectifies a difference of voltage of the first and second signal lines, a source voltage supplying unit, which supplies source voltage into the data storage device, an extracting unit, which extracts a clock in the data storage device on the basis of the first signal line, and a data demodulating unit, which detects the pulse position superimposed by the opposite polarity that is transmitted to the second signal line using the clock in the data storage device.

10. A controller for performing a data communication and supplying clocks and electric power by a first signal line and a second signal line between a data storage device and the controller, wherein the controller for performing data communication and supplying clocks and electric power by the first signal line and the second signal line between the controller and the data storage device, comprises:

a forming unit, which forms a first clock pulse of a first phase, the first clock pulse having a constant duty ratio and not being modulated, and a second clock pulse of a second phase, the second phase is opposite of the first phase;

a first transmitting unit, which transmits the first clock pulse to the first signal line;

a modulating unit, which modulates the second clock pulse depending on the presence or absence of a pulse in accordance with a logic of transmit data; and a second transmitting unit, which transmits the modulated second clock pulse to the second signal line.

11. A controller for performing a data communication and supplying clocks and electric power by a first signal line and a second signal line between a data storage device and the controller, wherein the controller for performing data communication and supplying clocks and electric power by the first signal line and the second signal line between the controller and the data storage device, comprises:

a forming unit, which forms a first clock pulse of a first phase, the first clock pulse having a constant duty ratio and not being modulated, and a second clock pulse of a second phase, the second phase is opposite of the first phase;

a first transmitting unit, which transmits the first clock pulse to the first signal line;

a modulating unit, which modulates the second clock pulse to be delayed, relative to the first clock pulse, by a first delay time when the transmitted data has a first logic and modulates the second clock pulse to be delayed, relative to the first clock pulse, by a second delay time when the transmitted data has a second logic; and a second transmitting unit, which transmits the modulated second clock pulse to the second signal line.

12. A controller for performing a data communication and supplying clocks and electric power by a first signal line and a second signal line between a data storage device and the controller, wherein the controller for performing data communication and supplying clocks and electric power by the first signal line and the second signal line between the controller and the data storage device, comprises:

a forming unit, which forms a first clock pulse of a first phase, the first clock pulse having a constant duty ratio and not being modulated, and a second clock pulse of a second phase, the second phase is opposite of the first phase;

a first transmitting unit, which transmits the first clock pulse to the first signal line;

a modulating unit, which modulates the second clock pulse by superimposing, at a position having an opposite polarity from a logic of transmit data, a pulse having the same polarity as the logic of the transmit data;

a second transmitting, which transmits the modulated second clock pulse to the second signal line.

13. A data storage device for performing a data communication and supplying clocks and electric power by a first signal line and a second signal line between a controller and the data storage device, wherein the data storage device for performing data communication and supplying clocks and electric power by the first signal line and the second signal line between the controller and the data storage device, comprises:

a rectifying unit, which rectifies the voltage of the first and second signal lines, the first signal line includes a first clock pulse of a first phase having a constant duty ratio and not being modulated and the second signal line includes a second clock pulse of a second phase that is modulated in accordance with a logic of transmit data, wherein the second phase is opposite of the first phase and the second clock pulse is formed depending on the presence or absence of a pulse in accordance with the logic of the transmit data, a source voltage supplying unit, which supplies source voltage to the data storage device, an extracting unit, which extracts a clock in the data storage device on the basis of the first signal line, and a data demodulating unit, which detects a presence or absence of the pulse in the second clock pulse transmitted by the second signal line using the clock in the data storage device.

14. A data storage device for performing a data communication and supplying clocks and electric power by a first signal line and a second signal line between a controller and the data storage device, wherein the data storage device for performing data communication and supplying clocks and electric power by the first signal line and the second signal line between the controller and the data storage device, comprises:

a rectifying unit, which rectifies the voltage of the first and second signal lines, the first signal line includes a first clock pulse of a first phase having a constant duty ratio and not being modulated and the second signal line includes a second clock pulse of a second phase that is modulated in accordance with a logic of transmit data, wherein the second phase is opposite of the first phase, and the second clock pulse is modulated to be delayed, relative to the first clock pulse, by a first delay time when the transmitted data has a first logic and modulated to be delayed, relative to the first clock pulse, by a second delay time when the transmitted data has a second logic;

a source voltage supplying unit, which supplies source voltage to the data storage device;

an extracting unit, which extracts a clock in the data storage device on the basis of the first signal line; and a data demodulating unit, which detects a change of a delay time associated with the second clock pulse transmitted by the second signal line using the clock in the data storage device.

15. A data storage device for performing a data communication and supplying clocks and electric power by a first signal line and a second signal line between a controller and the data storage device, wherein the data storage device for performing data communication and supplying clocks and electric power by the first signal line and the second signal line between the controller and the data storage device, comprises:

a rectifying unit, which rectifies the voltage of the first and second signal lines, the first signal line include a first clock pulse of a first phase having a constant duty ratio and not being modulated and the second signal line includes a second clock pulse of a second phase that is modulated in accordance with a logic of transmit data, wherein the second phase is opposite of the first phase, and the second clock pulse is formed by superimposing, at a position having an opposite polarity from the logic of the transmit data, a pulse having the same polarity as the logic of the transmit data;

a source voltage supplying unit, which supplies source voltage to the data storage device;

an extracting unit, which extracts a clock in the data storage device on the basis of the first signal line; and a data demodulating unit, which detects a pulse position superimposed by an opposite polarity that is transmitted to the second signal line using the clock in the data storage device.

* * * * *